US012691425B2

(12) United States Patent
Yang et al.

(10) Patent No.: US 12,691,425 B2
(45) Date of Patent: Jul. 28, 2026

(54) CARBONATION CHAMBER

(71) Applicant: SharkNinja Operating LLC, Needham, MA (US)

(72) Inventors: Tie He Yang, Shenzhen (CN); Jack Richardson, Yorkshire (GB); Christopher Meyer-Rassow, London (GB)

(73) Assignee: SharkNinja Operating LLC, Needham, MA (US)

( * ) Notice: Subject to any disclaimer, the term of this patent is extended or adjusted under 35 U.S.C. 154(b) by 147 days.

(21) Appl. No.: 18/434,482

(22) Filed: Feb. 6, 2024

(65) Prior Publication Data

US 2024/0416295 A1 Dec. 19, 2024

Related U.S. Application Data

(60) Division of application No. 18/354,376, filed on Jul. 18, 2023, now Pat. No. 11,931,704, which is a (Continued)

(51) Int. Cl.
B01F 23/236 (2022.01)
A23L 2/54 (2006.01)
(Continued)

(52) U.S. Cl.
CPC ............ B01F 23/2363 (2022.01); A23L 2/54 (2013.01); B01F 23/237621 (2022.01); (Continued)

(58) Field of Classification Search
CPC .......... B01F 23/2363; B01F 23/237621; B01F 33/453; B01F 2101/14; A23L 2/54; B67D 1/007; B67D 1/0071
See application file for complete search history.

(56) References Cited

U.S. PATENT DOCUMENTS

| | | |
|---|---|---|
| 236,478 A | 1/1881 | Ball et al. |
| 916,654 A | 3/1909 | Barwis |

(Continued)

FOREIGN PATENT DOCUMENTS

| | | |
|---|---|---|
| AU | 2014241782 A1 | 9/2015 |
| AU | 2012293327 C1 | 3/2016 |

(Continued)

OTHER PUBLICATIONS

U.S. Appl. No. 18/354,376, filed Jul. 18, 2023, Carbonation Chamber.

(Continued)

*Primary Examiner* — Emily M Le
(74) *Attorney, Agent, or Firm* — Mintz, Levin, Cohn, Ferris, Glovsky and Popeo, P.C.

(57) ABSTRACT

A mixing chamber for use in a beverage carbonation system is provided. In one embodiment, the mixing chamber includes a housing, an agitator, a motor assembly and a rigid plate. A housing of the agitator and a housing of the motor assembly can each include a set of magnetics disposed therein and magnetically coupled so as to provide magnetic coupling between the motor assembly and the agitator. The mixing chamber is configured to receive a gas, such as carbon dioxide, and a liquid, such as water, to form a carbonated fluid. The carbonated fluid can be dispensed from the beverage carbonation system as a beverage.

12 Claims, 12 Drawing Sheets

Related U.S. Application Data continuation of application No. PCT/CN2023/100706, filed on Jun. 16, 2023.

(51) Int. Cl.

| | | |
|---|---|---|
| *B01F 23/237* | (2022.01) | |
| *B01F 33/453* | (2022.01) | |
| *B67D 1/00* | (2006.01) | |
| *B01F 101/14* | (2022.01) | |

(52) U.S. Cl.
CPC ............ *B01F 33/453* (2022.01); *B67D 1/007* (2013.01); *B67D 1/0071* (2013.01); *B01F 2101/14* (2022.01)

(56) References Cited

U.S. PATENT DOCUMENTS

| | | | |
|---|---|---|---|
| 1,123,092 A | 12/1914 | Calvert | |
| 1,242,493 A | 10/1917 | Stringham | |
| 1,420,773 A | 6/1922 | Stainbrook | |
| 2,556,038 A | 6/1951 | Paul | |
| 3,419,193 A | 12/1968 | Stewart et al. | |
| 3,596,809 A | 8/1971 | Taubenheim | |
| 3,752,362 A | 8/1973 | Risener | |
| 3,888,466 A * | 6/1975 | Sedam ................ B01F 33/4537 |
| | | | 222/394 |
| 3,923,183 A | 12/1975 | Choksi et al. | |
| 4,062,466 A | 12/1977 | Conti | |
| 4,103,803 A | 8/1978 | Irvine | |
| 4,190,169 A | 2/1980 | Pehr | |
| 4,212,414 A | 7/1980 | Beyens | |
| 4,251,473 A | 2/1981 | Gilbey | |
| 4,408,701 A | 10/1983 | Jeans | |
| 4,411,369 A | 10/1983 | Borows | |
| 4,436,227 A | 3/1984 | Johnson, Jr. et al. | |
| 4,518,541 A | 5/1985 | Harris | |
| 4,533,068 A | 8/1985 | Meierhoefer | |
| 4,537,332 A * | 8/1985 | Brown ..................... B67D 3/00 |
| | | | 261/93 |
| 4,555,371 A | 11/1985 | Jeans | |
| 4,558,484 A | 12/1985 | Groth | |
| 4,567,993 A | 2/1986 | Albrecht et al. | |
| 4,676,287 A | 6/1987 | Fitzwater | |
| 4,726,494 A | 2/1988 | Scott | |
| 4,752,138 A | 6/1988 | Rufer | |
| 4,804,112 A * | 2/1989 | Jeans ..................... B67D 1/007 |
| | | | 261/DIG. 7 |
| 4,836,414 A | 6/1989 | Credle, Jr. et al. | |
| 4,866,324 A | 9/1989 | Yuzawa et al. | |
| 5,038,976 A | 8/1991 | McMillin | |
| 5,045,077 A | 9/1991 | Blake, III | |
| 5,102,010 A | 4/1992 | Osgar et al. | |
| RE33,969 E | 6/1992 | Richter | |
| 5,128,574 A | 7/1992 | Koizumi et al. | |
| 5,156,871 A | 10/1992 | Goulet et al. | |
| 5,160,461 A * | 11/1992 | Burrows ............. B01F 33/4531 |
| | | | 261/DIG. 7 |
| 5,199,609 A | 4/1993 | Ash, Jr. | |
| 5,205,440 A | 4/1993 | Matsushita | |
| 5,299,608 A | 4/1994 | Bosyj | |
| 5,329,975 A | 7/1994 | Heitel | |
| 5,330,154 A | 7/1994 | Mashburn et al. | |
| 5,364,184 A | 11/1994 | Rains | |
| 5,415,329 A | 5/1995 | Westlund | |
| 5,425,404 A | 6/1995 | Dyer | |
| 5,526,853 A | 6/1996 | McPhee et al. | |
| 5,549,228 A | 8/1996 | Brown | |
| 5,573,046 A | 11/1996 | Venooker et al. | |
| 5,642,761 A | 7/1997 | Holbrook | |
| 5,697,115 A | 12/1997 | Sciarra et al. | |
| 5,816,448 A | 10/1998 | Kobold | |
| 5,836,483 A | 11/1998 | Disel | |
| 5,842,682 A | 12/1998 | Schennum et al. | |
| 5,862,948 A | 1/1999 | Duchon et al. | |
| 5,870,944 A | 2/1999 | Vander et al. | |
| 5,884,679 A | 3/1999 | Hansen et al. | |
| 5,897,033 A | 4/1999 | Okawa et al. | |
| 5,924,606 A | 7/1999 | Huizing | |
| 5,947,171 A | 9/1999 | Woodruff | |
| 5,971,179 A | 10/1999 | Christmas et al. | |
| 5,975,164 A | 11/1999 | Whaley et al. | |
| 6,012,596 A | 1/2000 | Oglesbee et al. | |
| 6,014,970 A | 1/2000 | Ivri et al. | |
| 6,081,962 A | 7/2000 | Kasen et al. | |
| 6,082,586 A | 7/2000 | Banks | |
| 6,092,569 A | 7/2000 | Simmel et al. | |
| 6,095,677 A | 8/2000 | Karkos, Jr. et al. | |
| 6,142,750 A | 11/2000 | Benecke | |
| 6,158,486 A | 12/2000 | Olson et al. | |
| 6,167,586 B1 | 1/2001 | Reed, Jr. et al. | |
| 6,170,543 B1 | 1/2001 | Simmel et al. | |
| 6,179,167 B1 | 1/2001 | Boot et al. | |
| 6,182,949 B1 | 2/2001 | Mobbs | |
| 6,223,791 B1 | 5/2001 | Arsenault et al. | |
| 6,257,453 B1 | 7/2001 | Graham | |
| 6,269,837 B1 | 8/2001 | Arent et al. | |
| 6,276,560 B1 | 8/2001 | Belcastro | |
| 6,283,330 B1 | 9/2001 | Gillespie et al. | |
| 6,321,941 B1 | 11/2001 | Argentieri et al. | |
| 6,325,115 B1 | 12/2001 | Cowland et al. | |
| 6,336,603 B1 | 1/2002 | Karkos, Jr. et al. | |
| 6,363,235 B1 | 3/2002 | Chiesa et al. | |
| 6,386,392 B1 | 5/2002 | Argentieri et al. | |
| 6,390,335 B1 | 5/2002 | Lawson et al. | |
| 6,427,730 B2 | 8/2002 | Nagel et al. | |
| 6,450,214 B1 | 9/2002 | Dyer et al. | |
| 6,488,058 B1 | 12/2002 | Dyer et al. | |
| 6,601,734 B1 | 8/2003 | Smith | |
| 6,672,481 B2 | 1/2004 | Ziesel | |
| 6,685,056 B1 | 2/2004 | Argentieri et al. | |
| 6,688,499 B2 | 2/2004 | Zhang | |
| 6,712,497 B2 | 3/2004 | Jersey et al. | |
| 6,735,811 B2 | 5/2004 | Field et al. | |
| 6,758,372 B2 | 7/2004 | Studer et al. | |
| 6,771,925 B2 | 8/2004 | Satoh | |
| 6,820,763 B2 | 11/2004 | Bilskie et al. | |
| 6,832,706 B2 | 12/2004 | Hearld et al. | |
| 6,866,164 B2 | 3/2005 | Branson et al. | |
| 6,893,180 B2 | 5/2005 | Hall et al. | |
| 6,923,345 B1 | 8/2005 | Laible | |
| 6,951,295 B1 | 10/2005 | Gaus et al. | |
| 6,971,549 B2 | 12/2005 | Leifheit et al. | |
| 6,973,945 B2 | 12/2005 | Haimi | |
| 7,051,399 B2 | 5/2006 | Field et al. | |
| 7,051,888 B2 | 5/2006 | Antier et al. | |
| 7,083,071 B1 | 8/2006 | Crisp, III et al. | |
| 7,097,074 B2 | 8/2006 | Halliday et al. | |
| 7,104,531 B2 | 9/2006 | Page et al. | |
| 7,108,156 B2 | 9/2006 | Fox | |
| 7,114,707 B2 | 10/2006 | Rona et al. | |
| 7,121,437 B2 | 10/2006 | Kasting | |
| 7,121,438 B2 | 10/2006 | Hoepner et al. | |
| 7,134,575 B2 | 11/2006 | Vogel et al. | |
| 7,140,519 B1 | 11/2006 | Kiser | |
| 7,156,247 B2 | 1/2007 | Laburu | |
| 7,156,324 B2 | 1/2007 | Birrenkott et al. | |
| 7,163,127 B2 | 1/2007 | Seelhofer | |
| 7,163,192 B2 | 1/2007 | Aoki et al. | |
| 7,165,568 B2 | 1/2007 | Kessell et al. | |
| 7,165,695 B2 | 1/2007 | Choi | |
| 7,178,743 B2 | 2/2007 | Clarke, III et al. | |
| 7,213,506 B2 | 5/2007 | Halliday et al. | |
| 7,219,598 B2 | 5/2007 | Halliday et al. | |
| 7,231,869 B2 | 6/2007 | Halliday et al. | |
| 7,246,724 B2 | 7/2007 | Dave | |
| 7,255,039 B2 | 8/2007 | Halliday et al. | |
| 7,287,461 B2 | 10/2007 | Halliday et al. | |
| 7,288,276 B2 | 10/2007 | Rona et al. | |
| 7,305,986 B1 | 12/2007 | Steiner et al. | |
| 7,316,178 B2 | 1/2008 | Halliday et al. | |
| 7,322,277 B2 | 1/2008 | Halliday et al. | |
| 7,328,815 B2 | 2/2008 | Lowe | |
| 7,364,702 B2 | 4/2008 | Hoffman et al. | |

(56)

References Cited

U.S. PATENT DOCUMENTS

| | | |
|---|---|---|
| 7,407,117 B2 | 8/2008 | Dodd |
| 7,418,899 B2 | 9/2008 | Halliday et al. |
| 7,445,133 B2 | 11/2008 | Ludovissie et al. |
| 7,458,486 B2 | 12/2008 | Weist et al. |
| 7,510,095 B2 | 3/2009 | Comeau et al. |
| 7,513,192 B2 | 4/2009 | Sullivan et al. |
| 7,533,439 B2 | 5/2009 | Theiss, Jr. et al. |
| 7,533,603 B2 | 5/2009 | Halliday et al. |
| 7,533,604 B2 | 5/2009 | Halliday et al. |
| 7,544,289 B2 | 6/2009 | Straka et al. |
| 7,578,415 B2 | 8/2009 | Ziesel et al. |
| 7,592,027 B2 | 9/2009 | Halliday et al. |
| 7,607,385 B2 | 10/2009 | Halliday et al. |
| 7,607,591 B2 | 10/2009 | Barch et al. |
| 7,617,954 B2 | 11/2009 | Skillin |
| 7,621,426 B2 | 11/2009 | Reynolds et al. |
| 7,644,843 B1 | 1/2010 | Bush et al. |
| 7,648,049 B1 | 1/2010 | Lassota |
| 7,651,002 B2 | 1/2010 | Hennemann et al. |
| 7,669,737 B2 | 3/2010 | Bethuy et al. |
| 7,673,558 B2 | 3/2010 | Panesar et al. |
| 7,681,492 B2 | 3/2010 | Suggi et al. |
| 7,686,441 B2 | 3/2010 | Hashii et al. |
| 7,703,381 B2 | 4/2010 | Liverani et al. |
| 7,731,066 B2 | 6/2010 | Norris et al. |
| 7,731,161 B2 | 6/2010 | Seiwert et al. |
| 7,735,665 B2 | 6/2010 | Robinson |
| 7,762,438 B2 | 7/2010 | Skillin |
| 7,770,758 B2 | 8/2010 | Le Maner |
| 7,780,043 B2 | 8/2010 | Jourdin et al. |
| 7,784,311 B2 | 8/2010 | Santoemma et al. |
| 7,789,273 B2 | 9/2010 | Kadyk et al. |
| 7,806,294 B2 | 10/2010 | Gatipon et al. |
| 7,819,381 B2 | 10/2010 | Abe |
| 7,823,756 B2 | 11/2010 | Alley |
| 7,832,593 B2 | 11/2010 | Raterman et al. |
| 7,837,132 B2 | 11/2010 | Mazooji et al. |
| 7,841,491 B2 | 11/2010 | Contiero |
| 7,849,872 B2 | 12/2010 | Phillips et al. |
| 7,854,354 B2 | 12/2010 | Laible |
| 7,857,910 B2 | 12/2010 | Carhuff et al. |
| 7,896,203 B2 | 3/2011 | Myron |
| 7,918,436 B2 | 4/2011 | Hara |
| 7,975,881 B1 | 7/2011 | Glucksman et al. |
| 7,975,883 B2 | 7/2011 | Laib et al. |
| 7,975,988 B2 | 7/2011 | Thomson et al. |
| 7,980,421 B2 | 7/2011 | Ophardt et al. |
| 8,006,853 B2 | 8/2011 | Delage |
| 8,006,866 B2 | 8/2011 | Minard et al. |
| 8,020,733 B2 | 9/2011 | Snodgrass |
| 8,052,257 B2 | 11/2011 | Gonzales |
| 8,083,100 B2 | 12/2011 | Minard et al. |
| 8,087,347 B2 | 1/2012 | Halliday et al. |
| 8,087,545 B2 | 1/2012 | Ciavarella et al. |
| 8,113,384 B2 | 2/2012 | Bethuy et al. |
| 8,172,453 B2 | 5/2012 | Boussemart et al. |
| 8,210,736 B2 | 7/2012 | Raber |
| 8,282,268 B2 | 10/2012 | Karkos, Jr. et al. |
| 8,292,101 B1 | 10/2012 | Bragg et al. |
| 8,317,050 B2 | 11/2012 | Hollis et al. |
| 8,376,173 B2 | 2/2013 | Britto et al. |
| 8,376,182 B2 | 2/2013 | Lepage |
| 8,381,925 B2 | 2/2013 | Skillin et al. |
| 8,403,179 B1 | 3/2013 | Gerber |
| 8,430,134 B2 | 4/2013 | Gill |
| 8,434,639 B2 | 5/2013 | Markert |
| 8,448,804 B2 | 5/2013 | Luburic |
| 8,479,950 B2 | 7/2013 | Ophardt et al. |
| 8,517,212 B2 | 8/2013 | Antal, Sr. |
| 8,523,025 B2 | 9/2013 | Skillin et al. |
| 8,544,692 B2 | 10/2013 | Rusch et al. |
| 8,555,774 B2 | 10/2013 | Patera et al. |
| 8,584,578 B2 | 11/2013 | Koopman et al. |
| 8,590,746 B2 | 11/2013 | Bethuy et al. |
| 8,616,412 B2 | 12/2013 | Bethuy et al. |
| 8,621,990 B2 | 1/2014 | Fang et al. |
| 8,651,333 B2 | 2/2014 | Metropulos et al. |
| 8,661,966 B2 | 3/2014 | Stearns et al. |
| 8,668,376 B2 | 3/2014 | Krauchi et al. |
| 8,677,888 B2 | 3/2014 | Santoiemmo |
| 8,685,477 B2 | 4/2014 | Almblad et al. |
| 8,690,026 B2 | 4/2014 | Richards et al. |
| 8,727,515 B2 | 5/2014 | Dowell et al. |
| 8,733,566 B2 | 5/2014 | Druitt et al. |
| 8,746,506 B2 | 6/2014 | Jersey et al. |
| 8,757,227 B2 | 6/2014 | Girard et al. |
| 8,757,452 B2 | 6/2014 | Richards et al. |
| 8,770,094 B2 | 7/2014 | Rithener et al. |
| 8,794,126 B2 | 8/2014 | Skalski et al. |
| 8,807,392 B2 | 8/2014 | Smeller et al. |
| 8,807,824 B2 | 8/2014 | Bodum |
| 8,820,577 B2 | 9/2014 | Rusch et al. |
| 8,826,688 B2 | 9/2014 | Tachibana et al. |
| 8,833,241 B2 | 9/2014 | Santoiemmo |
| 8,833,584 B2 | 9/2014 | Groubert |
| 8,833,586 B2 | 9/2014 | Meyers et al. |
| 8,840,092 B2 | 9/2014 | Kumar et al. |
| 8,844,555 B2 | 9/2014 | Schneider |
| 8,846,121 B2 | 9/2014 | Hansen et al. |
| 8,863,991 B2 | 10/2014 | Cleary et al. |
| 8,869,824 B2 | 10/2014 | Arov |
| 8,881,948 B1 | 11/2014 | Lassota |
| 8,887,958 B2 | 11/2014 | Kadyk et al. |
| 8,887,959 B2 | 11/2014 | Hill et al. |
| 8,889,203 B2 | 11/2014 | York |
| 8,916,215 B2 | 12/2014 | Yoakim et al. |
| 8,919,240 B2 | 12/2014 | Ozanne et al. |
| 8,919,669 B2 | 12/2014 | Sandahl |
| 8,920,860 B2 | 12/2014 | Ring et al. |
| 8,960,500 B2 | 2/2015 | Van Opstal et al. |
| 8,960,506 B2 | 2/2015 | Beilke et al. |
| 8,985,395 B2 | 3/2015 | Tansey |
| 8,985,396 B2 | 3/2015 | Jersey et al. |
| 8,985,561 B2 | 3/2015 | Hatherell |
| 8,993,018 B2 | 3/2015 | Bucher et al. |
| 8,998,035 B2 | 4/2015 | Ford |
| 9,010,237 B2 | 4/2015 | Ozanne et al. |
| 9,026,245 B2 | 5/2015 | Tilton et al. |
| 9,027,466 B2 | 5/2015 | Bucher et al. |
| 9,044,718 B2 | 6/2015 | Ludwig et al. |
| 9,045,722 B2 | 6/2015 | Reif et al. |
| 9,051,162 B2 | 6/2015 | Peters et al. |
| 9,051,167 B2 | 6/2015 | Burge et al. |
| 9,056,287 B2 | 6/2015 | Peltola et al. |
| 9,060,650 B2 | 6/2015 | De Longhi |
| 9,073,673 B2 | 7/2015 | Mazurkiewicz et al. |
| 9,084,510 B2 | 7/2015 | Scorrano et al. |
| 9,107,448 B2 | 8/2015 | Giardino et al. |
| 9,107,449 B2 | 8/2015 | Njaastad et al. |
| 9,107,533 B2 | 8/2015 | Volz et al. |
| 9,114,368 B2 | 8/2015 | Njaastad et al. |
| 9,155,330 B1 | 10/2015 | Shtivelman |
| 9,155,418 B2 | 10/2015 | Lai et al. |
| 9,156,670 B2 | 10/2015 | Hill et al. |
| 9,161,654 B2 | 10/2015 | Belmont |
| 9,166,448 B2 | 10/2015 | Lam et al. |
| 9,167,935 B2 | 10/2015 | Scholvinck et al. |
| 9,169,048 B2 | 10/2015 | Ludewigs et al. |
| 9,193,506 B2 | 11/2015 | Madison et al. |
| 9,233,824 B2 | 1/2016 | Alan et al. |
| 9,290,317 B2 | 3/2016 | Quinn et al. |
| 9,295,278 B2 | 3/2016 | Nowak |
| 9,302,229 B2 | 4/2016 | Leung et al. |
| 9,320,382 B2 | 4/2016 | Lo Faro et al. |
| 9,320,385 B2 | 4/2016 | Spiegel et al. |
| 9,334,090 B1 | 5/2016 | Maple et al. |
| 9,352,897 B2 | 5/2016 | Hoshino |
| 9,364,018 B1 | 6/2016 | Peterson et al. |
| 9,371,176 B2 | 6/2016 | Kohli et al. |
| 9,375,686 B2 | 6/2016 | Boarman et al. |
| 9,388,033 B2 | 7/2016 | Gates |
| 9,409,680 B2 | 8/2016 | Van Alfen et al. |
| 9,409,757 B2 | 8/2016 | Reddy |
| 9,409,759 B2 | 8/2016 | Wilder et al. |

(56) References Cited

U.S. PATENT DOCUMENTS

| | | |
|---|---|---|
| 9,433,317 B2 | 9/2016 | Agon et al. |
| 9,434,532 B2 | 9/2016 | Yoakim et al. |
| 9,440,836 B2 | 9/2016 | Quittner et al. |
| 9,445,688 B2 | 9/2016 | Flick |
| 9,469,463 B2 | 10/2016 | Murray et al. |
| 9,481,508 B2 | 11/2016 | Oh |
| 9,486,102 B2 | 11/2016 | Baldo |
| 9,493,298 B2 | 11/2016 | Evans et al. |
| 9,504,348 B2 | 11/2016 | Windler et al. |
| 9,505,510 B2 | 11/2016 | Hatherell |
| 9,516,969 B2 | 12/2016 | Weflen |
| 9,521,924 B2 | 12/2016 | Priley et al. |
| 9,527,047 B2 | 12/2016 | Ring et al. |
| 9,538,876 B2 | 1/2017 | Ozanne et al. |
| D779,046 S | 2/2017 | Tansey, Jr. |
| 9,580,216 B2 | 2/2017 | Wisniewski |
| 9,582,699 B2 | 2/2017 | Jarisch et al. |
| 9,593,005 B2 | 3/2017 | Jersey et al. |
| 9,630,157 B2 | 4/2017 | Li et al. |
| 9,651,188 B2 | 5/2017 | Green et al. |
| 9,661,951 B2 | 5/2017 | Bugnano et al. |
| 9,664,264 B2 | 5/2017 | Kristlbauer |
| 9,668,604 B2 | 6/2017 | Yoakim et al. |
| 9,669,973 B2 | 6/2017 | Hoshino et al. |
| 9,687,796 B2 | 6/2017 | Hoare et al. |
| 9,701,527 B2 | 7/2017 | Tansey, Jr. |
| 9,708,109 B2 | 7/2017 | Marina et al. |
| 9,714,162 B2 | 7/2017 | Hecht et al. |
| 9,717,366 B2 | 8/2017 | Nevin et al. |
| 9,718,035 B2 | 8/2017 | Bandixen et al. |
| 9,723,863 B2 | 8/2017 | Njaastad et al. |
| 9,730,547 B2 | 8/2017 | Tanner et al. |
| 9,743,801 B2 | 8/2017 | Leuzinger et al. |
| 9,745,120 B2 | 8/2017 | Abegglen et al. |
| 9,745,185 B2 | 8/2017 | Klopfenstein et al. |
| 9,751,054 B2 | 9/2017 | Jin et al. |
| 9,754,437 B2 | 9/2017 | Deo et al. |
| 9,770,129 B2 | 9/2017 | Remo et al. |
| 9,783,403 B2 | 10/2017 | Tansey, Jr. |
| 9,783,405 B2 | 10/2017 | Olson et al. |
| 9,788,681 B2 | 10/2017 | Perentes et al. |
| 9,790,076 B2 | 10/2017 | Novak et al. |
| 9,796,506 B2 | 10/2017 | Meager |
| 9,801,500 B2 | 10/2017 | Ven Der Woning |
| 9,809,437 B2 | 11/2017 | Tansey, Jr. |
| 9,810,375 B2 | 11/2017 | Rider et al. |
| 9,811,704 B2 | 11/2017 | Kaeser |
| 9,821,951 B2 | 11/2017 | Estabrook et al. |
| 9,821,992 B2 | 11/2017 | Rudick et al. |
| 9,854,935 B2 | 1/2018 | Danieli et al. |
| 9,889,966 B2 | 2/2018 | Medeiros et al. |
| 9,896,322 B2 | 2/2018 | Hecht |
| 9,897,220 B2 | 2/2018 | Cohen et al. |
| 9,907,432 B2 | 3/2018 | Tanner et al. |
| 9,918,586 B2 | 3/2018 | Smith et al. |
| 9,945,603 B2 | 4/2018 | Hwang et al. |
| 9,957,145 B2 | 5/2018 | Cohen et al. |
| 9,974,410 B2 | 5/2018 | Ferrier |
| 9,980,596 B2 | 5/2018 | Rognon et al. |
| 9,981,801 B2 | 5/2018 | Ozanne et al. |
| 9,999,315 B2 | 6/2018 | Crarer et al. |
| 9,999,316 B2 | 6/2018 | Ye et al. |
| 10,000,370 B2 | 6/2018 | Bethuy et al. |
| 10,007,397 B2 | 6/2018 | Besson et al. |
| 10,017,372 B2 | 7/2018 | Bethuy et al. |
| 10,022,011 B2 | 7/2018 | Norton et al. |
| 10,028,614 B2 | 7/2018 | Perentes et al. |
| 10,034,573 B2 | 7/2018 | Flick et al. |
| 10,046,903 B2 | 8/2018 | Evans et al. |
| 10,046,904 B2 | 8/2018 | Evans et al. |
| 10,051,988 B2 | 8/2018 | Gordon et al. |
| 10,058,826 B2 | 8/2018 | Cohen et al. |
| 10,064,513 B2 | 9/2018 | Rehfuss |
| 10,070,751 B2 | 9/2018 | Magniet et al. |
| 10,076,208 B2 | 9/2018 | Castellani et al. |
| 10,080,461 B2 | 9/2018 | Bugnano et al. |
| 10,093,530 B2 | 10/2018 | Mackey et al. |
| 10,099,443 B1 | 10/2018 | Evans et al. |
| 10,106,392 B2 | 10/2018 | Peirsman et al. |
| 10,117,539 B2 | 11/2018 | Rognon et al. |
| 10,117,540 B2 | 11/2018 | De Vreede et al. |
| 10,130,211 B2 | 11/2018 | Bugnano et al. |
| 10,131,528 B2 | 11/2018 | Webster et al. |
| 10,131,529 B2 | 11/2018 | Jersey et al. |
| 10,136,755 B2 | 11/2018 | Talon |
| 10,143,978 B2 | 12/2018 | Tipton |
| 10,149,569 B2 | 12/2018 | Preshel |
| 10,155,647 B2 | 12/2018 | Foster et al. |
| 10,159,376 B2 | 12/2018 | Dovat et al. |
| 10,160,575 B2 | 12/2018 | Ray |
| 10,165,892 B2 | 1/2019 | Lafosse |
| 10,189,614 B2 | 1/2019 | Pruiett |
| 10,193,411 B2 | 1/2019 | Tajima et al. |
| 10,201,171 B2 | 2/2019 | Gordon et al. |
| 10,201,785 B2 | 2/2019 | Cohen et al. |
| 10,206,533 B2 | 2/2019 | Pirone |
| 10,211,438 B2 | 2/2019 | Ohashi et al. |
| 10,213,033 B2 | 2/2019 | Bratsch et al. |
| 10,213,752 B2 | 2/2019 | Shalev |
| 10,214,018 B2 | 2/2019 | Nozawa et al. |
| 10,227,226 B2 | 3/2019 | Jersey et al. |
| 10,229,401 B2 | 3/2019 | Yoakim |
| 10,231,569 B2 | 3/2019 | Perentes et al. |
| 10,233,002 B2 | 3/2019 | Baenninger et al. |
| 10,239,669 B2 | 3/2019 | Ayriss et al. |
| 10,258,186 B2 | 4/2019 | Rivera |
| 10,280,060 B2 | 5/2019 | Van Opstal et al. |
| 10,280,061 B2 | 5/2019 | Ko et al. |
| 10,294,020 B2 | 5/2019 | Nordqvist et al. |
| 10,307,718 B2 | 6/2019 | Waisman |
| 10,329,134 B2 | 6/2019 | Olson et al. |
| 10,334,871 B2 | 7/2019 | Van De Sluis et al. |
| 10,336,597 B2 | 7/2019 | Griscik et al. |
| 10,343,885 B2 | 7/2019 | Novak et al. |
| 10,349,773 B2 | 7/2019 | Segiet et al. |
| 10,350,561 B1 | 7/2019 | Dushine et al. |
| 10,358,269 B2 | 7/2019 | Cerveny |
| 10,364,089 B2 | 7/2019 | Daniels, Jr. et al. |
| 10,365,141 B2 | 7/2019 | Freiburger et al. |
| 10,370,235 B2 | 8/2019 | Pellaud |
| 10,377,540 B2 | 8/2019 | Borgardt et al. |
| 10,377,620 B2 | 8/2019 | Makino et al. |
| 10,384,839 B2 | 8/2019 | Yamaguchi |
| 10,398,254 B2 | 9/2019 | Tinkler et al. |
| 10,399,769 B2 | 9/2019 | Talon et al. |
| 10,399,838 B2 | 9/2019 | Green |
| 10,399,839 B2 | 9/2019 | Knoll et al. |
| 10,405,690 B2 | 9/2019 | Tentorio |
| 10,405,691 B2 | 9/2019 | Hesselbrock et al. |
| 10,406,488 B2 | 9/2019 | Song et al. |
| 10,413,872 B2 | 9/2019 | Thangamuthu et al. |
| 10,414,557 B2 | 9/2019 | Skillin et al. |
| 10,414,642 B2 | 9/2019 | Melville, Jr. et al. |
| 10,433,668 B2 | 10/2019 | Merali et al. |
| 10,433,671 B2 | 10/2019 | Surface |
| 10,442,591 B2 | 10/2019 | Rognard et al. |
| 10,455,968 B1 | 10/2019 | Singer |
| 10,455,973 B2 | 10/2019 | Dollner et al. |
| 10,455,974 B2 | 10/2019 | Talon |
| 10,456,539 B2 | 10/2019 | Hearn et al. |
| 10,456,757 B1 | 10/2019 | Blichmann |
| 10,457,450 B2 | 10/2019 | Rios |
| 10,470,605 B2 | 11/2019 | Ergican et al. |
| 10,479,669 B2 | 11/2019 | Kim et al. |
| 10,485,374 B2 | 11/2019 | Lo Faro et al. |
| 10,486,953 B2 | 11/2019 | Pellaud et al. |
| 10,488,097 B2 | 11/2019 | Nachawati et al. |
| 10,494,246 B2 | 12/2019 | Hecht et al. |
| 10,506,896 B2 | 12/2019 | Ven Der Woning |
| 10,507,958 B2 | 12/2019 | Hashimoto et al. |
| 10,513,424 B2 | 12/2019 | Tansey, Jr. |
| 10,518,938 B2 | 12/2019 | Suzuki et al. |
| 10,518,942 B2 | 12/2019 | Seibert et al. |
| 10,519,020 B2 | 12/2019 | Ozawa et al. |

(56) References Cited

U.S. PATENT DOCUMENTS

| | | | |
|---|---|---|---|
| 10,524,617 | B2 | 1/2020 | Perrin et al. |
| 10,526,186 | B2 | 1/2020 | Kuboi et al. |
| 10,526,192 | B2 | 1/2020 | Holley et al. |
| 10,543,977 | B2 | 1/2020 | Brockman et al. |
| 10,548,430 | B2 | 2/2020 | Guard et al. |
| 10,555,636 | B2 | 2/2020 | Carr et al. |
| 10,562,700 | B2 | 2/2020 | Weijers et al. |
| 10,568,452 | B2 | 2/2020 | Fin et al. |
| 10,595,549 | B2 | 3/2020 | Van De Sluis et al. |
| 10,595,668 | B2 | 3/2020 | Tinkler et al. |
| 10,604,310 | B2 | 3/2020 | Kutsuzawa et al. |
| 10,604,398 | B2 | 3/2020 | Smeller et al. |
| 10,618,705 | B1 | 4/2020 | Laible |
| 10,631,686 | B2 | 4/2020 | Abdo et al. |
| 10,647,564 | B2 | 5/2020 | Showalter |
| 10,654,700 | B2 | 5/2020 | Hecht |
| 10,674,857 | B2 | 6/2020 | Lyons et al. |
| 10,674,863 | B2 | 6/2020 | Sevcik et al. |
| 10,676,336 | B2 | 6/2020 | Makino et al. |
| 10,682,007 | B2 | 6/2020 | Fischer |
| 10,682,593 | B2 | 6/2020 | Baird |
| 10,702,835 | B2 | 7/2020 | Tran et al. |
| 10,702,838 | B2 | 7/2020 | Chaussin et al. |
| 10,703,618 | B2 | 7/2020 | Ziesel |
| 10,707,734 | B2 | 7/2020 | Holenstein et al. |
| 10,710,864 | B2 | 7/2020 | Jangbarwala et al. |
| 10,717,567 | B2 | 7/2020 | Sakamoto et al. |
| 10,717,637 | B2 | 7/2020 | Pellaud et al. |
| 10,743,707 | B2 | 8/2020 | Bugnano et al. |
| 10,759,594 | B2 | 9/2020 | Mills et al. |
| 10,765,254 | B2 | 9/2020 | Totti et al. |
| 10,766,756 | B2 | 9/2020 | Gatipon et al. |
| 10,772,460 | B2 | 9/2020 | Accursi |
| 10,780,408 | B2 | 9/2020 | Schöb et al. |
| 10,791,752 | B2 | 10/2020 | Siegel et al. |
| 10,793,346 | B2 | 10/2020 | Bartoli et al. |
| 10,800,581 | B2 | 10/2020 | Berroa Garcia |
| 10,807,049 | B2 | 10/2020 | Abdo et al. |
| 10,807,853 | B2 | 10/2020 | Balstad et al. |
| 10,813,501 | B2 | 10/2020 | Helf et al. |
| 10,820,741 | B2 | 11/2020 | Byun et al. |
| 10,820,744 | B2 | 11/2020 | Rubin et al. |
| 10,820,745 | B2 | 11/2020 | Zwicker et al. |
| 10,820,746 | B2 | 11/2020 | Noth |
| 10,827,875 | B2 | 11/2020 | Noth |
| 10,828,586 | B2 | 11/2020 | Simpson et al. |
| 10,829,359 | B2 | 11/2020 | Von Kraus et al. |
| 10,842,313 | B2 | 11/2020 | Novak et al. |
| 10,843,142 | B2 | 11/2020 | Waggoner et al. |
| 10,843,849 | B1 | 11/2020 | Berge |
| 10,843,866 | B2 | 11/2020 | Cafaro et al. |
| 10,846,975 | B2 | 11/2020 | Tansey, Jr. et al. |
| 10,849,451 | B2 | 12/2020 | Su |
| 10,849,454 | B2 | 12/2020 | Gordon et al. |
| 10,859,177 | B2 | 12/2020 | Kuzuya |
| 10,869,572 | B2 | 12/2020 | Blatt |
| 10,870,566 | B2 | 12/2020 | Green et al. |
| 10,882,728 | B2 | 1/2021 | Hong et al. |
| 10,883,072 | B2 | 1/2021 | Hong et al. |
| 10,893,773 | B2 | 1/2021 | Standaar et al. |
| 10,894,639 | B2 | 1/2021 | Pruiett |
| 10,894,706 | B2 | 1/2021 | Totti et al. |
| 10,898,026 | B2 | 1/2021 | Fin |
| 10,899,600 | B2 | 1/2021 | Frieburger et al. |
| 10,905,287 | B2 | 2/2021 | Tu et al. |
| 10,906,013 | B2 | 2/2021 | Cohen et al. |
| 10,918,239 | B2 | 2/2021 | Hartmann et al. |
| 10,919,752 | B2 | 2/2021 | Breault |
| 10,925,433 | B2 | 2/2021 | Hansen et al. |
| 10,926,945 | B2 | 2/2021 | Kennedy et al. |
| 10,940,494 | B2 | 3/2021 | Romanov et al. |
| 10,945,554 | B2 | 3/2021 | Lo Faro et al. |
| 10,945,557 | B2 | 3/2021 | Nishimura et al. |
| 10,947,485 | B2 | 3/2021 | Min et al. |
| 10,952,562 | B2 | 3/2021 | Tanner et al. |
| 10,954,043 | B2 | 3/2021 | Taruno |
| 10,961,027 | B1 | 3/2021 | Laible |
| 10,966,563 | B2 | 4/2021 | Dubief et al. |
| 10,966,564 | B2 | 4/2021 | Rijskamp et al. |
| 10,973,364 | B2 | 4/2021 | Hesselbrock et al. |
| 10,981,123 | B2 | 4/2021 | Park |
| 10,981,700 | B2 | 4/2021 | Migas et al. |
| 10,993,575 | B2 | 5/2021 | Krug et al. |
| 10,993,576 | B2 | 5/2021 | Fedorak et al. |
| 10,994,980 | B2 | 5/2021 | Jangbarwala et al. |
| 11,001,490 | B2 | 5/2021 | Headley et al. |
| 11,008,206 | B2 | 5/2021 | Pappas |
| 11,013,363 | B1 | 5/2021 | Alsudairi et al. |
| 11,021,359 | B2 | 6/2021 | Bissen et al. |
| 11,026,539 | B2 | 6/2021 | Zosimadis et al. |
| 11,033,141 | B2 | 6/2021 | Schlack |
| 11,039,712 | B2 | 6/2021 | Egli et al. |
| 11,040,806 | B2 | 6/2021 | Naumann et al. |
| 11,049,354 | B2 | 6/2021 | Yoakim |
| 11,053,053 | B2 | 7/2021 | Jordan |
| 11,059,636 | B2 | 7/2021 | Maeda |
| 11,064,715 | B2 | 7/2021 | Herbert et al. |
| 11,072,521 | B2 | 7/2021 | Walker |
| 11,078,066 | B2 | 8/2021 | Crackel et al. |
| 11,084,007 | B2 | 8/2021 | Adams |
| 11,084,701 | B2 | 8/2021 | Kuboi et al. |
| 11,085,435 | B2 | 8/2021 | Dobbins et al. |
| 11,096,517 | B2 | 8/2021 | Spijker et al. |
| 11,097,236 | B2 | 8/2021 | Alexander et al. |
| 11,109,708 | B2 | 9/2021 | Lecomte et al. |
| 11,110,418 | B2 | 9/2021 | Furman et al. |
| 11,124,404 | B2 | 9/2021 | Von Kraus et al. |
| 11,129,490 | B2 | 9/2021 | Park et al. |
| 11,129,491 | B2 | 9/2021 | Park et al. |
| 11,147,410 | B2 | 10/2021 | Hachenberger et al. |
| 11,148,927 | B2 | 10/2021 | Wing et al. |
| 11,166,593 | B2 | 11/2021 | Trakselis |
| 11,167,231 | B2 | 11/2021 | Akdim et al. |
| 11,180,293 | B2 | 11/2021 | Sahara et al. |
| 11,191,286 | B2 | 12/2021 | Cross et al. |
| 11,192,711 | B2 | 12/2021 | Jarisch et al. |
| 11,194,443 | B2 | 12/2021 | Deo et al. |
| 11,203,515 | B2 | 12/2021 | Cook |
| 11,206,941 | B2 | 12/2021 | Abdo et al. |
| 11,208,310 | B2 | 12/2021 | Tansey, Jr. et al. |
| 11,208,313 | B2 | 12/2021 | Conover et al. |
| 11,208,314 | B2 | 12/2021 | Peirsman et al. |
| 11,235,267 | B1 | 2/2022 | Santoiemmo |
| 11,242,195 | B2 | 2/2022 | Nordqvist et al. |
| 11,246,326 | B2 | 2/2022 | Feola |
| 11,247,186 | B2 | 2/2022 | Topp-Manske |
| 11,247,892 | B2 | 2/2022 | Moore et al. |
| 11,250,659 | B2 | 2/2022 | Tansey, Jr. et al. |
| 11,252,976 | B2 | 2/2022 | Popov et al. |
| 11,254,491 | B2 | 2/2022 | Krüger |
| 11,254,586 | B1 | 2/2022 | Santoiemmo |
| 11,274,027 | B2 | 3/2022 | Krüger et al. |
| 11,284,734 | B2 | 3/2022 | Hilckmann et al. |
| 11,284,736 | B2 | 3/2022 | Ochoa et al. |
| 11,292,642 | B2 | 4/2022 | Hiltser et al. |
| 11,292,646 | B2 | 4/2022 | Bai et al. |
| 11,292,706 | B2 | 4/2022 | Showalter |
| 11,292,707 | B2 | 4/2022 | Lecomte et al. |
| 11,297,850 | B2 | 4/2022 | Popov et al. |
| 11,304,557 | B2 | 4/2022 | De Vreede et al. |
| 11,312,604 | B2 | 4/2022 | Mehta et al. |
| 11,325,760 | B2 | 5/2022 | Alderson et al. |
| 11,325,818 | B2 | 5/2022 | Dahlberg et al. |
| 11,337,542 | B2 | 5/2022 | Kroos |
| 11,339,045 | B2 | 5/2022 | Conway et al. |
| 11,344,151 | B2 | 5/2022 | Rolla |
| 11,345,581 | B2 | 5/2022 | Cook |
| 11,345,583 | B2 | 5/2022 | Aslam et al. |
| 11,370,648 | B2 | 6/2022 | Melville, Jr. et al. |
| 11,407,629 | B1 | 8/2022 | Siegel |
| 11,407,630 | B1 | 8/2022 | Shafir |
| 11,440,786 | B2 | 9/2022 | Springer et al. |
| 11,465,892 | B1 | 10/2022 | Dos Santos |
| 11,470,994 | B2 | 10/2022 | Hashimoto |

(56) References Cited

U.S. PATENT DOCUMENTS

| | | | |
|---|---|---|---|
| 11,479,457 B2 | 10/2022 | Krüger et al. | |
| 11,612,865 B1 | 3/2023 | Reisner-Stehman et al. | |
| 11,634,314 B1 | 4/2023 | Anthony et al. | |
| 11,647,860 B1 | 5/2023 | Anthony et al. | |
| 11,745,996 B1 | 9/2023 | Zbedlick | |
| 11,751,585 B1 | 9/2023 | Anthony et al. | |
| 2002/0121531 A1 | 9/2002 | Stillinger et al. | |
| 2002/0130140 A1 | 9/2002 | Cote | |
| 2002/0158075 A1 | 10/2002 | Caldicott et al. | |
| 2003/0012849 A1 | 1/2003 | Berson | |
| 2003/0168455 A1 | 9/2003 | Zettle et al. | |
| 2004/0195245 A1 | 10/2004 | Gohil | |
| 2005/0000053 A1 | 1/2005 | Kasper et al. | |
| 2005/0040131 A1 | 2/2005 | Lin | |
| 2005/0151764 A1 | 7/2005 | Grady et al. | |
| 2005/0184075 A1 | 8/2005 | Belcastro | |
| 2005/0191759 A1 | 9/2005 | Pedersen-Bjergaard et al. | |
| 2006/0071040 A1 | 4/2006 | Young | |
| 2006/0124662 A1 | 6/2006 | Reynolds et al. | |
| 2006/0196892 A1 | 9/2006 | Crisp et al. | |
| 2008/0078769 A1 | 4/2008 | Crunkleton et al. | |
| 2008/0272144 A1 | 11/2008 | Bonney et al. | |
| 2008/0287880 A1 | 11/2008 | Keller | |
| 2009/0140006 A1 | 6/2009 | Vitantonio et al. | |
| 2009/0214742 A1 | 8/2009 | Peden et al. | |
| 2009/0236361 A1 | 9/2009 | Doelman et al. | |
| 2010/0089921 A1 | 4/2010 | Ellenkamp-Van et al. | |
| 2010/0170841 A1 | 7/2010 | An et al. | |
| 2010/0192782 A1 | 8/2010 | Blumenauer et al. | |
| 2010/0251901 A1 | 10/2010 | Santoiemmo | |
| 2011/0011889 A1 | 1/2011 | Bonney et al. | |
| 2011/0107545 A1 | 5/2011 | Cagnina et al. | |
| 2011/0181417 A1 | 7/2011 | Haskayne et al. | |
| 2011/0186535 A1 | 8/2011 | Meager | |
| 2011/0290828 A1 | 12/2011 | Lolk | |
| 2012/0187153 A1 | 7/2012 | Burge et al. | |
| 2012/0193318 A1 | 8/2012 | Meager | |
| 2013/0026665 A1 | 1/2013 | Buosi et al. | |
| 2013/0062366 A1 | 3/2013 | Tansey | |
| 2013/0098499 A1 | 4/2013 | Bencista et al. | |
| 2013/0233878 A1 | 9/2013 | Lindmayer | |
| 2014/0004241 A1 | 1/2014 | Hatherell | |
| 2014/0070431 A1 | 3/2014 | Hatherell | |
| 2014/0154368 A1 | 6/2014 | Kolls et al. | |
| 2014/0175125 A1 | 6/2014 | Breault | |
| 2014/0231442 A1 | 8/2014 | Hill et al. | |
| 2014/0272019 A1 | 9/2014 | Schuh et al. | |
| 2014/0349385 A1* | 11/2014 | Erdenberger ....... B01F 35/4122 |
| | | | 435/302.1 |
| 2015/0050392 A1 | 2/2015 | Stonehouse et al. | |
| 2015/0125578 A1 | 5/2015 | Hatherell | |
| 2015/0125586 A1 | 5/2015 | Ergican | |
| 2015/0151258 A1* | 6/2015 | Cohen ................. B01F 23/2363 |
| 2015/0166252 A1 | 6/2015 | Jones | |
| 2015/0225169 A1 | 8/2015 | Jarisch | |
| 2015/0374025 A1 | 12/2015 | Evans et al. | |
| 2016/0009539 A1 | 1/2016 | Jersey et al. | |
| 2016/0130076 A1 | 5/2016 | Jarisch | |
| 2016/0192806 A1 | 7/2016 | Pikkemaat et al. | |
| 2016/0242456 A1 | 8/2016 | Evans et al. | |
| 2016/0251208 A1 | 9/2016 | Tansey, Jr. | |
| 2016/0255991 A1 | 9/2016 | Givens, Jr. et al. | |
| 2016/0318689 A1 | 11/2016 | Rudick et al. | |
| 2016/0332124 A1 | 11/2016 | Cohen | |
| 2017/0215645 A1 | 8/2017 | Doglioni Majer et al. | |
| 2017/0225880 A1 | 8/2017 | Vivier et al. | |
| 2017/0246597 A1 | 8/2017 | McClean et al. | |
| 2017/0280750 A1 | 10/2017 | Arnaud et al. | |
| 2017/0334636 A1 | 11/2017 | Park et al. | |
| 2017/0341856 A1 | 11/2017 | Aschwanden | |
| 2017/0370629 A1 | 12/2017 | Fire | |
| 2018/0000280 A1 | 1/2018 | Dubief | |
| 2018/0057337 A1 | 3/2018 | Babucke et al. | |
| 2018/0086621 A1 | 3/2018 | Dubief et al. | |
| 2018/0093820 A1 | 4/2018 | Massey et al. | |
| 2018/0215603 A1 | 8/2018 | Hecht | |
| 2018/0251358 A1 | 9/2018 | Wing et al. | |
| 2018/0251361 A1 | 9/2018 | Wing et al. | |
| 2018/0312386 A1 | 11/2018 | Brun-Kestler et al. | |
| 2018/0354713 A1 | 12/2018 | Ting et al. | |
| 2019/0077586 A1 | 3/2019 | Cafaro et al. | |
| 2019/0134583 A1 | 5/2019 | Lautenschläger et al. | |
| 2019/0144804 A1 | 5/2019 | Hong et al. | |
| 2019/0146641 A1 | 5/2019 | Deo et al. | |
| 2019/0153368 A1 | 5/2019 | Yoon et al. | |
| 2019/0166886 A1 | 6/2019 | Gordon et al. | |
| 2019/0169016 A1 | 6/2019 | Vandekerckhove et al. | |
| 2019/0191916 A1 | 6/2019 | Guyon et al. | |
| 2019/0231119 A1 | 8/2019 | Kennedy et al. | |
| 2019/0241420 A1 | 8/2019 | Peirsman et al. | |
| 2019/0269156 A1 | 9/2019 | Van De Sluis et al. | |
| 2019/0270630 A1 | 9/2019 | Dahan et al. | |
| 2019/0274469 A1 | 9/2019 | Van De Sluis | |
| 2019/0274482 A1 | 9/2019 | Abdo et al. | |
| 2019/0275478 A1* | 9/2019 | Jersey ................. B01F 35/2115 |
| 2019/0282980 A1* | 9/2019 | Alexander .............. B01F 33/45 |
| 2019/0290054 A1 | 9/2019 | Weber et al. | |
| 2019/0291062 A1 | 9/2019 | Wood et al. | |
| 2019/0291064 A1 | 9/2019 | Conroy et al. | |
| 2019/0292034 A1 | 9/2019 | Wood et al. | |
| 2019/0292036 A1 | 9/2019 | Rice et al. | |
| 2019/0328170 A1 | 10/2019 | Cai | |
| 2019/0335952 A1 | 11/2019 | Di Bari | |
| 2019/0337713 A1 | 11/2019 | Ergican et al. | |
| 2019/0344233 A1 | 11/2019 | Savino | |
| 2019/0367350 A1 | 12/2019 | Bhutani et al. | |
| 2020/0000272 A1 | 1/2020 | Nabeiro et al. | |
| 2020/0010311 A1 | 1/2020 | Moore | |
| 2020/0017806 A1 | 1/2020 | Peirsman et al. | |
| 2020/0031651 A1 | 1/2020 | Schneidewend et al. | |
| 2020/0047137 A1 | 2/2020 | Wilder et al. | |
| 2020/0054172 A1 | 2/2020 | Trakselis | |
| 2020/0060465 A1 | 2/2020 | Longman et al. | |
| 2020/0062476 A1 | 2/2020 | Katayama et al. | |
| 2020/0077841 A1 | 3/2020 | Dercar et al. | |
| 2020/0079637 A1 | 3/2020 | Kaplita et al. | |
| 2020/0100618 A1 | 4/2020 | Guyon et al. | |
| 2020/0107671 A1 | 4/2020 | Gordon et al. | |
| 2020/0121115 A1 | 4/2020 | Oh | |
| 2020/0122100 A1 | 4/2020 | Tumey | |
| 2020/0122994 A1 | 4/2020 | Cimatti et al. | |
| 2020/0146308 A1 | 5/2020 | Roberts et al. | |
| 2020/0146500 A1 | 5/2020 | Cafaro et al. | |
| 2020/0146501 A1 | 5/2020 | McHugh et al. | |
| 2020/0156019 A1 | 5/2020 | Sawyer et al. | |
| 2020/0170443 A1 | 6/2020 | Chioda et al. | |
| 2020/0187718 A1 | 6/2020 | Seidl | |
| 2020/0198956 A1 | 6/2020 | Hartsfield et al. | |
| 2020/0207603 A1 | 7/2020 | Sevcik | |
| 2020/0216786 A1 | 7/2020 | Pintz | |
| 2020/0229472 A1 | 7/2020 | Manne | |
| 2020/0231372 A1 | 7/2020 | Parise | |
| 2020/0253361 A1 | 8/2020 | Davidson | |
| 2020/0281396 A1 | 9/2020 | Accursi et al. | |
| 2020/0331739 A1 | 10/2020 | Mehta et al. | |
| 2020/0345170 A1 | 11/2020 | Jarisch et al. | |
| 2020/0359822 A1 | 11/2020 | Dercar et al. | |
| 2020/0359841 A1 | 11/2020 | Dercar et al. | |
| 2020/0360875 A1 | 11/2020 | Danieli et al. | |
| 2020/0361758 A1 | 11/2020 | Fantappié et al. | |
| 2020/0367689 A1 | 11/2020 | Illy et al. | |
| 2020/0369440 A1 | 11/2020 | Croibier et al. | |
| 2020/0369446 A1 | 11/2020 | Mélan-Moutet | |
| 2020/0369504 A1 | 11/2020 | Balstad et al. | |
| 2020/0369505 A1 | 11/2020 | McKay | |
| 2020/0375221 A1 | 12/2020 | Colvin et al. | |
| 2020/0397184 A1 | 12/2020 | Ruggiero et al. | |
| 2021/0000289 A1 | 1/2021 | Krüger et al. | |
| 2021/0002044 A1 | 1/2021 | Koenigseder | |
| 2021/0002046 A1 | 1/2021 | Da Costa et al. | |
| 2021/0013785 A1 | 1/2021 | Liang et al. | |
| 2021/0015303 A1 | 1/2021 | Byun et al. | |
| 2021/0032087 A1 | 2/2021 | Tessicini et al. | |
| 2021/0052104 A1 | 2/2021 | Perentes | |

(56) References Cited

U.S. PATENT DOCUMENTS

| | | | |
|---|---|---|---|
| 2021/0100394 A1 | 4/2021 | Affolter et al. |
| 2021/0101722 A1 | 4/2021 | Migas et al. |
| 2021/0106163 A1 | 4/2021 | Van De Sluis et al. |
| 2021/0122540 A1 | 4/2021 | Meager |
| 2021/0127891 A1 | 5/2021 | Wei |
| 2021/0127902 A1 | 5/2021 | Deng et al. |
| 2021/0137304 A1 | 5/2021 | Krger et al. |
| 2021/0137315 A1 | 5/2021 | Byun et al. |
| 2021/0147138 A1 | 5/2021 | Affolter et al. |
| 2021/0171333 A1 | 6/2021 | Amos |
| 2021/0177189 A1 | 6/2021 | Kordich et al. |
| 2021/0179411 A1 | 6/2021 | Dahan et al. |
| 2021/0188530 A1 | 6/2021 | Pellegrini et al. |
| 2021/0196074 A1 | 7/2021 | Guarin et al. |
| 2021/0259286 A1 | 8/2021 | Siegel et al. |
| 2021/0259472 A1 | 8/2021 | Seidler et al. |
| 2021/0261324 A1 | 8/2021 | Arnold |
| 2021/0275942 A1 | 9/2021 | Stryker et al. |
| 2021/0276748 A1 | 9/2021 | Deslandes et al. |
| 2021/0292152 A1 | 9/2021 | Fedorka et al. |
| 2021/0307564 A1 | 10/2021 | Gort-Barten |
| 2021/0309422 A1 | 10/2021 | Hiltser et al. |
| 2021/0316913 A1 | 10/2021 | Woody et al. |
| 2021/0316979 A1 | 10/2021 | Hayes-Pankhurst et al. |
| 2021/0317393 A1 | 10/2021 | Peirsman et al. |
| 2021/0338004 A1 | 11/2021 | Alsayar et al. |
| 2021/0347623 A1 | 11/2021 | Fantappie et al. |
| 2021/0354883 A1 | 11/2021 | Ferrari et al. |
| 2021/0361112 A1 | 11/2021 | Hobden et al. |
| 2021/0362993 A1 | 11/2021 | Shafir et al. |
| 2021/0378267 A1 | 12/2021 | Barak |
| 2021/0380392 A1 | 12/2021 | Glucksman et al. |
| 2022/0002134 A1 | 1/2022 | Pellaud |
| 2022/0022496 A1 | 1/2022 | Monsanto et al. |
| 2022/0024748 A1 | 1/2022 | Fantappie et al. |
| 2022/0031110 A1 | 2/2022 | Sekulic et al. |
| 2022/0031113 A1 | 2/2022 | Smith et al. |
| 2022/0033172 A1 | 2/2022 | Favre |
| 2022/0039587 A1 | 2/2022 | De Freitas |
| 2022/0039602 A1 | 2/2022 | Xiong |
| 2022/0040651 A1 | 2/2022 | Böttcher et al. |
| 2022/0042618 A1 | 2/2022 | Kuzuya |
| 2022/0053967 A1 | 2/2022 | Guyon et al. |
| 2022/0061581 A1 | 3/2022 | Fernandes De Carvalho et al. |
| 2022/0071435 A1 | 3/2022 | Tseng |
| 2022/0071437 A1 | 3/2022 | Tseng |
| 2022/0071440 A1 | 3/2022 | Tseng et al. |
| 2022/0071441 A1 | 3/2022 | Patil et al. |
| 2022/0073238 A1 | 3/2022 | Naumann et al. |
| 2022/0073336 A1 | 3/2022 | Savioz |
| 2022/0088937 A1 | 3/2022 | Oya |
| 2022/0098020 A1 | 3/2022 | Garcia Tebar |
| 2022/0106180 A1 | 4/2022 | Rue et al. |
| 2022/0135294 A1 | 5/2022 | Peng et al. |
| 2022/0169424 A1 | 6/2022 | Yang |
| 2022/0287333 A1 | 9/2022 | Aldred et al. |
| 2022/0289548 A1 | 9/2022 | Augsburger |
| 2022/0296015 A1 | 9/2022 | Crane |

FOREIGN PATENT DOCUMENTS

| | | | |
|---|---|---|---|
| AU | 2013284311 B2 | 12/2016 |
| AU | 2014241782 B2 | 9/2017 |
| AU | 2016259900 A1 | 11/2017 |
| AU | 2016200626 B2 | 3/2018 |
| AU | 2018201199 B2 | 11/2018 |
| AU | 2017394249 A1 | 7/2019 |
| AU | 2019238313 A1 | 11/2020 |
| BR | 112014032633 B1 | 4/2020 |
| BR | 112021003593 A2 | 5/2021 |
| CA | 3081923 A1 | 2/2013 |
| CA | 2903862 A1 | 9/2014 |
| CA | 2904325 A1 | 9/2014 |
| CA | 2920909 A1 | 2/2015 |
| CA | 2961901 A1 | 4/2016 |
| CA | 2967927 A1 | 5/2016 |
| CA | 2977475 A1 | 9/2016 |
| CA | 2983958 A1 | 11/2016 |
| CA | 2996900 A1 | 3/2017 |
| CA | 2781759 C | 9/2017 |
| CA | 2837286 C | 11/2017 |
| CA | 2837064 C | 1/2018 |
| CA | 3041722 A1 | 5/2018 |
| CA | 3047084 A1 | 6/2018 |
| CA | 3049841 A1 | 7/2018 |
| CA | 3079433 A1 | 4/2019 |
| CA | 3095669 A1 | 9/2019 |
| CA | 2936866 C | 10/2019 |
| CA | 2875899 C | 12/2019 |
| CA | 2843702 C | 7/2020 |
| CA | 3081920 C | 9/2021 |
| CN | 1016312 B | 4/1992 |
| CN | 201200323 Y | 3/2009 |
| CN | 101432221 B | 8/2012 |
| CN | 101300190 B | 2/2013 |
| CN | 103213928 A | 7/2013 |
| CN | 203314745 U | 12/2013 |
| CN | 203576299 U | 5/2014 |
| CN | 102842181 B | 1/2015 |
| CN | 104654699 A | 5/2015 |
| CN | 104828373 A | 8/2015 |
| CN | 105000258 A | 10/2015 |
| CN | 103720363 B | 11/2015 |
| CN | 105377408 A | 3/2016 |
| CN | 103648963 B | 4/2016 |
| CN | 103213928 B | 5/2016 |
| CN | 105595868 A | 5/2016 |
| CN | 103687800 B | 8/2016 |
| CN | 103781538 B | 9/2016 |
| CN | 103663329 B | 4/2017 |
| CN | 103430117 B | 5/2017 |
| CN | 105307973 B | 9/2017 |
| CN | 103841862 B | 10/2017 |
| CN | 105078252 B | 10/2017 |
| CN | 102712453 B | 11/2017 |
| CN | 105188897 B | 11/2017 |
| CN | 107530653 A | 1/2018 |
| CN | 108024654 A | 5/2018 |
| CN | 105712278 B | 8/2018 |
| CN | 208291834 U | 12/2018 |
| CN | 109171502 A | 1/2019 |
| CN | 109380973 A | 2/2019 |
| CN | 109922668 A | 6/2019 |
| CN | 104582509 B | 7/2019 |
| CN | 106715322 B | 8/2019 |
| CN | 105849030 B | 9/2019 |
| CN | 110198910 A | 9/2019 |
| CN | 110234592 A | 9/2019 |
| CN | 110247484 A | 9/2019 |
| CN | 106073500 B | 10/2019 |
| CN | 107108192 B | 10/2019 |
| CN | 107074522 B | 1/2020 |
| CN | 209988362 U | 1/2020 |
| CN | 107108191 B | 2/2020 |
| CN | 107438580 B | 3/2020 |
| CN | 105011305 B | 5/2020 |
| CN | 111356648 A | 6/2020 |
| CN | 108910815 B | 7/2020 |
| CN | 111386060 A | 7/2020 |
| CN | 111466793 A | 7/2020 |
| CN | 106793808 B | 8/2020 |
| CN | 111589315 A | 8/2020 |
| CN | 111744378 A | 10/2020 |
| CN | 110529604 B | 12/2020 |
| CN | 112218819 A | 1/2021 |
| CN | 112421819 A | 2/2021 |
| CN | 112998522 A | 6/2021 |
| CN | 113038840 A | 6/2021 |
| CN | 107205445 B | 7/2021 |
| CN | 113165861 A | 7/2021 |
| CN | 113226052 A | 8/2021 |
| CN | 108768070 B | 9/2021 |
| CN | 214731066 U | 11/2021 |
| CN | 110980621 B | 1/2022 |

(56) References Cited

FOREIGN PATENT DOCUMENTS

| | | | |
|---|---|---|---|
| CN | 113905975 | A | 1/2022 |
| CN | 109863112 | B | 2/2022 |
| CN | 113995076 | A | 2/2022 |
| CN | 112313168 | B | 10/2022 |
| DE | 202015104155 | U1 | 11/2015 |
| EP | 0268451 | A2 | 5/1988 |
| EP | 0843983 | A1 | 5/1998 |
| EP | 1005897 | A2 | 6/2000 |
| EP | 1351758 | A1 | 10/2003 |
| EP | 1607664 | B1 | 1/2008 |
| EP | 1767262 | B1 | 8/2008 |
| EP | 1718403 | B1 | 5/2011 |
| EP | 2340754 | A1 | 7/2011 |
| EP | 2359260 | A1 | 8/2011 |
| EP | 2340754 | B1 | 10/2012 |
| EP | 2504270 | A1 | 10/2012 |
| EP | 2504271 | A1 | 10/2012 |
| EP | 1966065 | B2 | 11/2012 |
| EP | 2714577 | A1 | 4/2014 |
| EP | 2737834 | A1 | 6/2014 |
| EP | 2969899 | A2 | 1/2016 |
| EP | 2714577 | B1 | 7/2016 |
| EP | 2719450 | B1 | 7/2016 |
| EP | 2504270 | B1 | 11/2016 |
| EP | 3003542 | A4 | 1/2017 |
| EP | 3021686 | A4 | 2/2017 |
| EP | 2359260 | B1 | 6/2017 |
| EP | 3197820 | A2 | 8/2017 |
| EP | 2976975 | B1 | 1/2018 |
| EP | 3261981 | A1 | 1/2018 |
| EP | 3212562 | A4 | 6/2018 |
| EP | 2741845 | B1 | 8/2018 |
| EP | 3294443 | A4 | 1/2019 |
| EP | 3040114 | B1 | 3/2019 |
| EP | 3275345 | B1 | 3/2019 |
| EP | 3349622 | A4 | 6/2019 |
| EP | 3221251 | B1 | 10/2019 |
| EP | 3533937 | A3 | 11/2019 |
| EP | 3452403 | A4 | 1/2020 |
| EP | 2504271 | B1 | 4/2020 |
| EP | 3537891 | A4 | 5/2020 |
| EP | 3554988 | A4 | 7/2020 |
| EP | 2866593 | B1 | 8/2020 |
| EP | 3643676 | A3 | 8/2020 |
| EP | 3697724 | A1 | 8/2020 |
| EP | 2714578 | B1 | 12/2020 |
| EP | 3760795 | A1 | 1/2021 |
| EP | 3762331 | A1 | 1/2021 |
| EP | 3200610 | B1 | 2/2021 |
| EP | 3571152 | A4 | 3/2021 |
| EP | 3834622 | A1 | 6/2021 |
| EP | 3212563 | B1 | 9/2021 |
| EP | 3869973 | A1 | 9/2021 |
| EP | 3870535 | A1 | 9/2021 |
| EP | 3871994 | A1 | 9/2021 |
| EP | 3877322 | A1 | 9/2021 |
| EP | 3883389 | A1 | 9/2021 |
| EP | 3768629 | A4 | 12/2021 |
| EP | 3808230 | B1 | 6/2022 |
| EP | 4047360 | A1 | 8/2022 |
| EP | 4069626 | A1 | 10/2022 |
| ES | 2351796 | T3 | 2/2011 |
| ES | 2532901 | T3 | 4/2015 |
| ES | 2749388 | T3 | 3/2020 |
| FR | 3078531 | B1 | 5/2021 |
| GB | 2259653 | A | 3/1993 |
| GB | 2486872 | A | 7/2012 |
| GB | 2526734 | A | 12/2015 |
| GB | 2486872 | B | 3/2016 |
| IL | 119044 | A | 9/2004 |
| KR | 19990011885 | U | 3/1999 |
| RU | 2491875 | C2 | 9/2013 |
| WO | 8503853 | A1 | 9/1985 |
| WO | 9725130 | A1 | 7/1997 |
| WO | 9807122 | A1 | 2/1998 |
| WO | 0103817 | A1 | 1/2001 |
| WO | 03083431 | A2 | 10/2003 |
| WO | 03098776 | A1 | 11/2003 |
| WO | 2006063087 | A2 | 6/2006 |
| WO | 2009027053 | A1 | 3/2009 |
| WO | 2009135758 | A1 | 11/2009 |
| WO | 2009136781 | A1 | 11/2009 |
| WO | 2012025425 | A1 | 3/2012 |
| WO | 2012082712 | A1 | 6/2012 |
| WO | 2013019963 | A2 | 2/2013 |
| WO | 2013019963 | A3 | 5/2013 |
| WO | 2014182423 | A2 | 11/2014 |
| WO | 2014182423 | A3 | 12/2014 |
| WO | 2014201753 | A1 | 12/2014 |
| WO | 2015109639 | A1 | 7/2015 |
| WO | 2016073069 | A1 | 5/2016 |
| WO | 2016087474 | A1 | 6/2016 |
| WO | 2016202815 | A1 | 12/2016 |
| WO | 2017096505 | A1 | 6/2017 |
| WO | 2017109718 | A1 | 6/2017 |
| WO | 2019170548 | A1 | 9/2019 |
| WO | 2019183540 | A1 | 9/2019 |
| WO | 2020084615 | A1 | 4/2020 |
| WO | 2020086425 | A1 | 4/2020 |
| WO | 2020092859 | A1 | 5/2020 |
| WO | 2020097558 | A1 | 5/2020 |
| WO | 2020097728 | A1 | 5/2020 |
| WO | 2020092859 | A8 | 6/2020 |
| WO | 2020148294 | A1 | 7/2020 |
| WO | 2020148293 | A3 | 9/2020 |
| WO | 2020174336 | A1 | 9/2020 |
| WO | 2020193376 | A1 | 10/2020 |
| WO | 2020198811 | A1 | 10/2020 |
| WO | 2020219385 | A1 | 10/2020 |
| WO | 2020234060 | A1 | 11/2020 |
| WO | 2020243452 | A1 | 12/2020 |
| WO | 2021016331 | A1 | 1/2021 |
| WO | 2021016343 | A1 | 1/2021 |
| WO | 2021018760 | A1 | 2/2021 |
| WO | 2021019161 | A1 | 2/2021 |
| WO | 2021028654 | A2 | 2/2021 |
| WO | 2021032892 | A1 | 2/2021 |
| WO | 2021055937 | A1 | 3/2021 |
| WO | 2021061553 | A1 | 4/2021 |
| WO | 2021061614 | A1 | 4/2021 |
| WO | 2021090186 | A1 | 5/2021 |
| WO | 2021093936 | A1 | 5/2021 |
| WO | 2021101990 | A1 | 5/2021 |
| WO | 2021115135 | A1 | 6/2021 |
| WO | 2021138385 | A1 | 7/2021 |
| WO | 2021140254 | A1 | 7/2021 |
| WO | 2021168069 | A1 | 8/2021 |
| WO | 2021174309 | A1 | 9/2021 |
| WO | 2021191774 | A1 | 9/2021 |
| WO | 2021198162 | A1 | 10/2021 |
| WO | 2021209507 | A1 | 10/2021 |
| WO | 2021228877 | A1 | 11/2021 |
| WO | 2021233931 | A1 | 11/2021 |
| WO | 2021240307 | A1 | 12/2021 |
| WO | 2021240308 | A1 | 12/2021 |
| WO | 2021240311 | A1 | 12/2021 |
| WO | 2022020764 | A1 | 1/2022 |
| WO | 2022038408 | A1 | 2/2022 |
| WO | 2022051389 | A1 | 3/2022 |
| WO | 2022101253 | A1 | 5/2022 |
| WO | 2022106683 | A1 | 5/2022 |
| WO | 2022126811 | A1 | 6/2022 |
| WO | 2022189622 | A1 | 9/2022 |
| WO | 2022189623 | A1 | 9/2022 |
| WO | 2022194644 | A1 | 9/2022 |

OTHER PUBLICATIONS

International Patent Application No. PCT/CN2022/092688 entitled "Agitator For A Carbonation System", filed on May 13, 2022, 51 pages.
U.S. Appl. No. 17/821,212 entitled "Beverage Carbonation System Flow Control", filed on Aug. 22, 2022, 32 pages.

(56) References Cited

OTHER PUBLICATIONS

Chemineer, Inc., "BT-6 Gas Dispersion Impeller", 2013, 2 pages.
Electrical Technology, "Brushless DC Motor (BLDC)—Construction, Working & Applications", available at https://www.electricaltechnology.org/2016/05/bldc-brushless-dc-motor-construction-working-principle.html, May 2016, 11 pages.
Scargiali, Francesca, "Gas-liquid Dispersions in Mechanically Agitated Contactors", PhD Thesis, University of Naples, Department of Chemical, Materials And Industrial Production Engineering, 2007, 185 pages.
SPX Flow Inc., "Lightnin Mixers General Overview", SPX® FLOW, Mar. 2019, 12 pages.
International Search Report and Written Opinion Received for PCT Patent Application No. PCT/CN2023/100706, mailed on Mar. 5, 2024, 8 pages.

* cited by examiner

501

503

505

500

615

617

617

617

601

611  613

609

600

607

605

Adding a liquid to a carbonation mixing chamber. <u>801</u>

Adding a gas to a carbonation mixing chamber. <u>803</u>

Agitating a mixture of gas liquid within a carbonation mixing chamber to form a carbonated liquid. <u>805</u>

CARBONATION CHAMBER

CROSS-REFERENCE TO RELATED APPLICATIONS

This application is a divisional of U.S. application Ser. No. 18/354,376, filed on Jul. 18, 2023, entitled "CARBONATION CHAMBER," which is a continuation application which claims the benefit of Application No. PCT/CN2023/100706, filed on Jun. 16, 2023, entitled "CARBONATION CHAMBER," each of which is hereby incorporated by reference in its entirety.

TECHNICAL FIELD

A carbonation chamber for use in a beverage carbonation machine is provided.

BACKGROUND

In food products such as soda, sparkling water, tea, juice, or coffee, carbon dioxide ($CO_2$) or a combination of nitrogen and $CO_2$ is typically used to create the bubbles that form and rise through the liquid. Several factors dictate the carbonation level of beverages, including sugar and alcohol; however, the most significant factors are $CO_2$ pressure and temperature. The quantity of $CO_2$ dissolved in a beverage can impact the flavor, mouthfeel, and palatability of the beverage.

Many existing carbonated beverage producers carbonate beverages in their manufacturing plants and then add carbonated beverages in appropriate pressure bottles, tanks or other containers to authorized distributors of carbonated beverages, retailers, grocery stores, etc. Commercial beverage carbonation usually involves mixing carbon-dioxide with liquid under pressure with intensive mixing. Such commercial methods, however, require elaborate and sophisticated equipment not available at the point of beverage consumption. Further, shipping and storage of pressurized bottles and containers increases costs.

Beverage carbonation machines suitable for home use have been developed, but typically utilize a specialized container to be attached to the device. The container is pre-filled with liquid and is pressurized with carbon dioxide injected into the liquid. One common complaint of people who use home seltzer machines is that the sodas these machines produce are not as bubbly as store-bought versions. Another common complaint is that beverage carbonation machines suitable for home use may require a user to carbonate the full container at a time, unless they are willing to accept a significant reduction in carbon dioxide efficiency from their container.

Accordingly, there remains a need for improved methods and devices for carbonating a liquid.

SUMMARY

Carbonation chambers for use in carbonating a liquid are provided.

In one embodiment, a carbonation mixing chamber is provided having a housing, an agitator, a motor assembly, and a rigid plate. The housing can have an inner chamber with a fluid inlet configured to receive fluid from a fluid source, a gas inlet configured to receive gas from a gas source, and an outlet configured to dispense a mixture of fluid and gas. The agitator can be disposed within the housing and can have an elongate shaft with a plurality of arms extending radially outward from the elongate shaft. The agitator can also have an agitator coupling housing at a terminal end of the elongate shaft and having a first set of magnets disposed therein. The motor assembly can be disposed external to the housing and can have a motor coupling housing with a second set of magnets disposed therein and positioned in magnetic engagement with the first set of magnets. The motor assembly can also include a drive shaft coupled to the motor coupling housing, and a motor coupled to the drive shaft and configured to rotate the drive shaft and the motor coupling housing such that the second set of magnets cause corresponding rotation of the first set of magnets to thereby rotate the agitator. The rigid plate can form a portion of an outer wall of the housing and can be positioned between the agitator coupling housing and the motor coupling housing.

One or more of the following features can be included in any feasible combination. For example, the housing can be formed from plastic, and the rigid plate can be formed from metal. The housing can include an upper portion and a lower portion mated to one another to define the inner chamber therein, and the agitator coupling housing can be positioned on a bottom wall of the lower portion of the housing. In certain embodiments, the housing can include a sidewall with a minimum thickness that is greater than a maximum thickness of the rigid plate. In other aspects, the inner surface of the housing can include a plurality of ribs positioned radially around the inner chamber.

In another embodiment, the rigid plate can be mounted within a central opening in a wall of the housing, and a sealing gasket can be positioned between the rigid plate and the housing to form a seal there between. The rigid plate can form a portion of the bottom wall of the lower portion. In some embodiments, the rigid plate can include a central divot configured to receive a central nub on the terminal end of the elongate shaft. In other aspects, the rigid plate can be formed from a non-ferromagnetic metal.

In other aspects, one or more of the fluid inlet, gas inlet, and outlet can include a valve movable between open and closed positions, and the inner chamber can be configured to be fluidically sealed when the valves are in the closed position.

In another embodiment, a carbonation system is provided and can include a housing having a fluid reservoir configured to hold a volume of fluid, a mixing chamber housing configured to receive fluid from the fluid reservoir and gas from a gas source and to mix the fluid and gas to form a carbonated beverage, and a fluid outlet configured to dispense the carbonated beverage. The mixing chamber housing can include a plate mounted in a sidewall thereof and positioned between inner and outer magnetic drive housings. The outer magnetic drive housing can be coupled to a motor configured to rotate the outer magnetic drive housing to cause corresponding rotation of the inner magnetic drive housing, and the inner magnetic drive housing can be coupled to an agitator blade configured to agitate fluid and gas in the mixing chamber housing.

One or more of the following features can be included in any feasible combination. For example, the mixing chamber housing can be formed from plastic and the plate can be formed from metal.

In one example, the mixing chamber housing can include an outer sidewall with a minimum wall thickness that is greater than a maximum thickness of the plate. The mixing chamber housing can include a domed upper portion and a cup-shaped lower portion mated to one another.

In another example, the inner magnetic drive housing can include a first set of magnets disposed therein and magnetically coupled to a second set of magnets disposed within the outer magnetic drive housing. Further, the inner magnetic drive housing and agitator blade can be mounted on a central shaft having a terminal end freely movably positioned within a divot formed in the plate.

In another embodiment, a method for mixing fluid and gas is provided. The method can include the steps of activating a motor to rotate an outer magnetic drive housing and thereby cause corresponding rotation of an inner magnetic drive housing disposed within a mixing chamber and positioned on an opposite side of a separation plate from the outer magnetic drive housing, the mixing chamber being fluidically sealed and having a fluid and a gas disposed therein, and rotation of the inner magnetic drive housing rotating an agitator coupled thereto to thereby mix the fluid and gas.

One or more of the following features can be included in any feasible combination. For example, the agitator can include a plurality of arms extending radially outward from a central shaft, a terminal end of the central shaft being freely movably positioned within a divot formed in the separation plate.

In another example, prior to mixing, the gas can be located above the liquid within the mixing chamber, and during rotation of the agitator the gas can flow into an upper opening in an elongate shaft of the agitator and out of a lower opening of the elongate shaft of the agitator.

In yet another example, the mixing chamber can be disposed within a beverage dispensing system, and the method include the step of dispensing the mixed fluid and gas into a container.

DESCRIPTION OF DRAWINGS

These and other features will be more readily understood from the following detailed description taken in conjunction with the accompanying drawings, in which.

Figure 1:
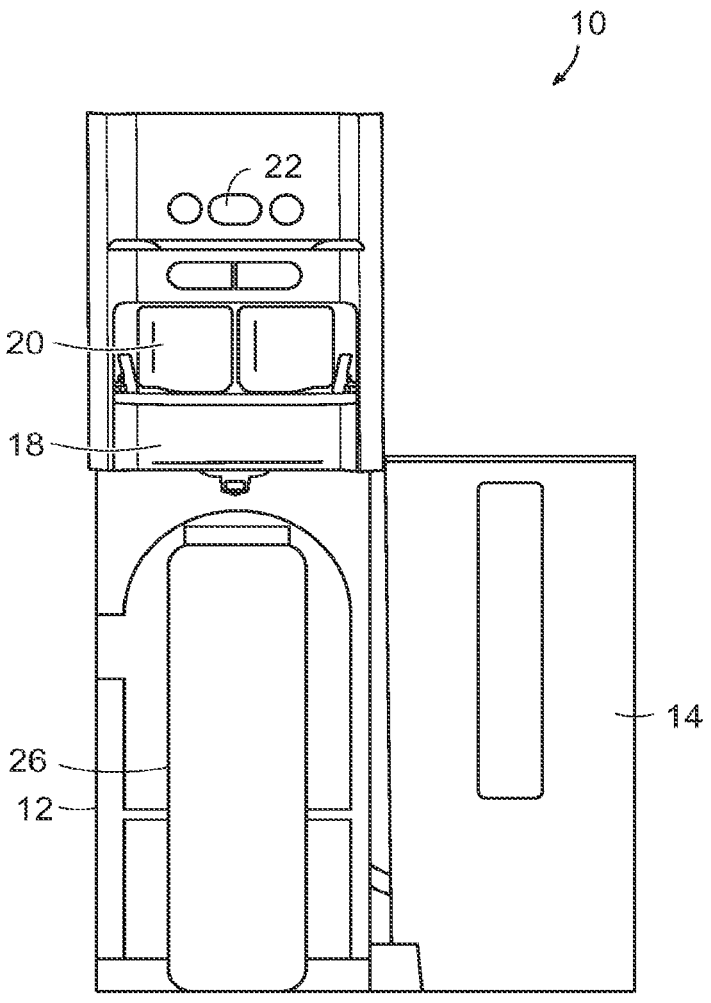
FIG. 1 is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment can be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, a carbonation mixing chamber for use with a carbonation system is provided. In some embodiments, the carbonation mixing chamber includes a housing, an agitator, a motor assembly, and a rigid plate. In general, the agitator (also referred to herein as an "impeller") is configured to rotate in the mixing chamber to mix together a gas, such as carbon dioxide ($CO_2$), and a liquid, such as water, to form a carbonated fluid. The agitator can include an agitator coupling housing at a terminal end of an elongate shaft and having a first set of magnets disposed therein. The motor assembly can be disposed external to the housing and can have a motor coupling housing with a second set of magnets disposed therein and positioned in magnetic engagement with the first set of magnets. The motor assembly can also include a drive shaft coupled to the motor coupling housing, and a motor coupled to the drive shaft and configured to rotate the drive shaft and the motor coupling housing such that the second set of magnets cause corresponding rotation of the first set of magnets to thereby rotate the agitator. The rigid plate can form a portion of an outer wall of the housing and can be positioned between the agitator coupling housing and the motor coupling housing. The magnetic coupling between the first set of magnets in the agitator housing and the second set of magnets in the motor coupling housing allows for the fast movement of the agitator within the carbonation mixing chamber thereby allowing for the fast diffusion of a gas within a liquid.

The mixing of liquids and gasses within the carbonation mixing chamber requires high pressure. The high pressure within the chamber and the pressure differential between the interior of the chamber and the environment can cause damage to physical couplings utilized between the agitator and the motor. Accordingly, in the disclosed embodiments, the agitator housing and the motor coupling housing utilize a magnetic coupling, which does not require the presence of a physical coupling such as a combination of reciprocal holes and steel rods that are positioned to rotatably link the motor and agitator. In order to transmit magnetic forces across a wall of the housing, the wall must be relatively thin. A thin wall, especially one formed from plastic, however, may not withstand the high pressures required in a carbonation system. Accordingly, the disclosed systems can include a thin rigid plate, such as metal plate, which forms a portion of an outer wall of the housing and can be positioned between the agitator coupling housing and the motor coupling housing. The rigid plate can provide an interface between the magnetic couplings that avoids a rapid drop in magnetic force, while withstanding high pressures. The modified carbonation system can thus achieve the various benefits described herein.

Figure 2:
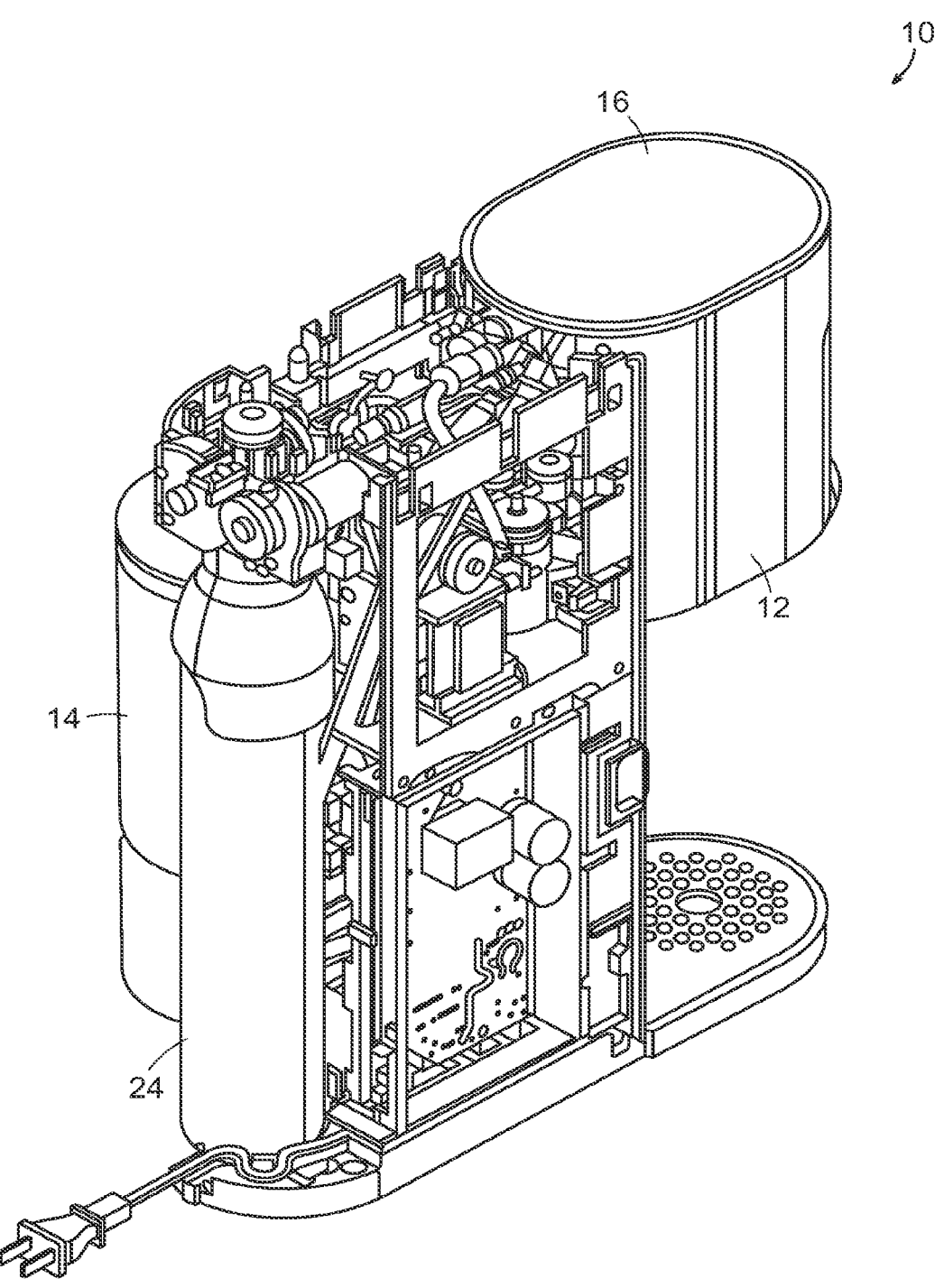
FIG. 2 is a rear perspective view of the beverage dispensing system of FIG. 1 with various housing components removed.

FIGS. 1-2 illustrate a beverage dispensing system 10 according to one embodiment. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. In the illustrated system 10, a carriage assembly 18 is included for receiving one or more ingredient containers 20 to be used in the creation of beverages. The ingredient containers 20 can include one or more additives (e.g., a flavorant, a vitamin, a food dye, etc.) to be included in a created beverage as desired. However, a person skilled in the art will appreciate that the mixing chamber disclosed herein can be used in any beverage dispensing system, including those that lack an ingredient container. Other beverage dispensing systems include, by way of non-limiting example, coffee, tea, beer, juice, and similar beverage-making apparatus.

During a beverage dispensing process, a user can actuate inputs located at a user interface 22 in order to select specific characteristics of the desired beverage, such as fluid volume and carbonation level. If the user selects inputs to indicate that the beverage is carbonated, water can be fed from the fluid reservoir 14 and into the carbonation assembly 16, and carbon-dioxide can be fed from a canister 24 and into the carbonation assembly 16 to produce carbonated water. The beverage can be dispensed into a container, such as a drinking glass 26.

Examples of beverage dispensing systems compatible with the carbonation mixing chamber provided herein can be found in U.S. patent application Ser. No. 17/989,640, entitled "INGREDIENT CONTAINERS FOR USE WITH BEVERAGE DISPENSERS" filed on Nov. 17, 2022, and U.S. patent application Ser. No. 17/744,459, entitled "FLAVORED BEVERAGE CARBONATION SYSTEM" filed on Can 13, 2022, the contents of both of which are hereby incorporated by reference in their entirety.

FIGS. 3-14 illustrate one embodiment of a carbonation mixing chamber 200 for use with a carbonation system, such as the system 10 shown in FIGS. 1-2. The carbonation illustrated mixing chamber includes a housing 300, an agitator 400, a motor assembly 600, and a rigid plate 500, each of which is described in more detail below.

The housing 300 can have a variety of configurations and can have various shapes and sizes. While the particular configuration can vary depending on the beverage system configured to contain the housing 300, in the illustrated embodiment the housing 300 includes an upper portion 301 and a lower portion 303 that mate to define an inner chamber 202 therein. As shown, the upper portion 301 can have a substantially domed hemispheric shape, and can include projections on one side 326 containing one or more fluid inlets, sensors, gas inlets, and valves. The upper portion 301 can also include a flat face 304 at the terminal edge thereof, with a ridge 327 projecting from the flat face 304. The ridge 327 can be substantial circumferential and it can be configured to receive an o-ring 328 to aid in forming a seal with the lower portion 303. The flat face of the hemispheric shape can also include a protruding flange 317 containing one or more holes 325 configured to receive one or more screws 321. The lower portion 303 can be similarly hemi-spherical or cup-shaped, however it can have a height that is less than a height of the upper portion 301. Further, the bottom wall of the lower portion 303 can have an enlarged, substantially circular opening 339 formed therein. The opening 339 can be configured to be filled by the rigid plate 500, as discussed below. The lower portion 303 can also include a flattened rim 329 at the terminal end thereof. The rim 329 can have a circumferential channel 331 configured to receive the ridge 327 on the upper portion 301. The lower portion 303 can also include a plurality of holes 333 in the rim 329 that are configured to align with the holes 325 in the upper portion 301 and to receive screws 321 there through for mating the upper and lower portions 301, 303. In some embodiments, the holes 325 and 333 can be threaded. When mated, the o-ring is compressed thereby forming a fluid-tight seal between the upper and lower portions 301, 303 to create a sealed chamber therein.

Figure 4:
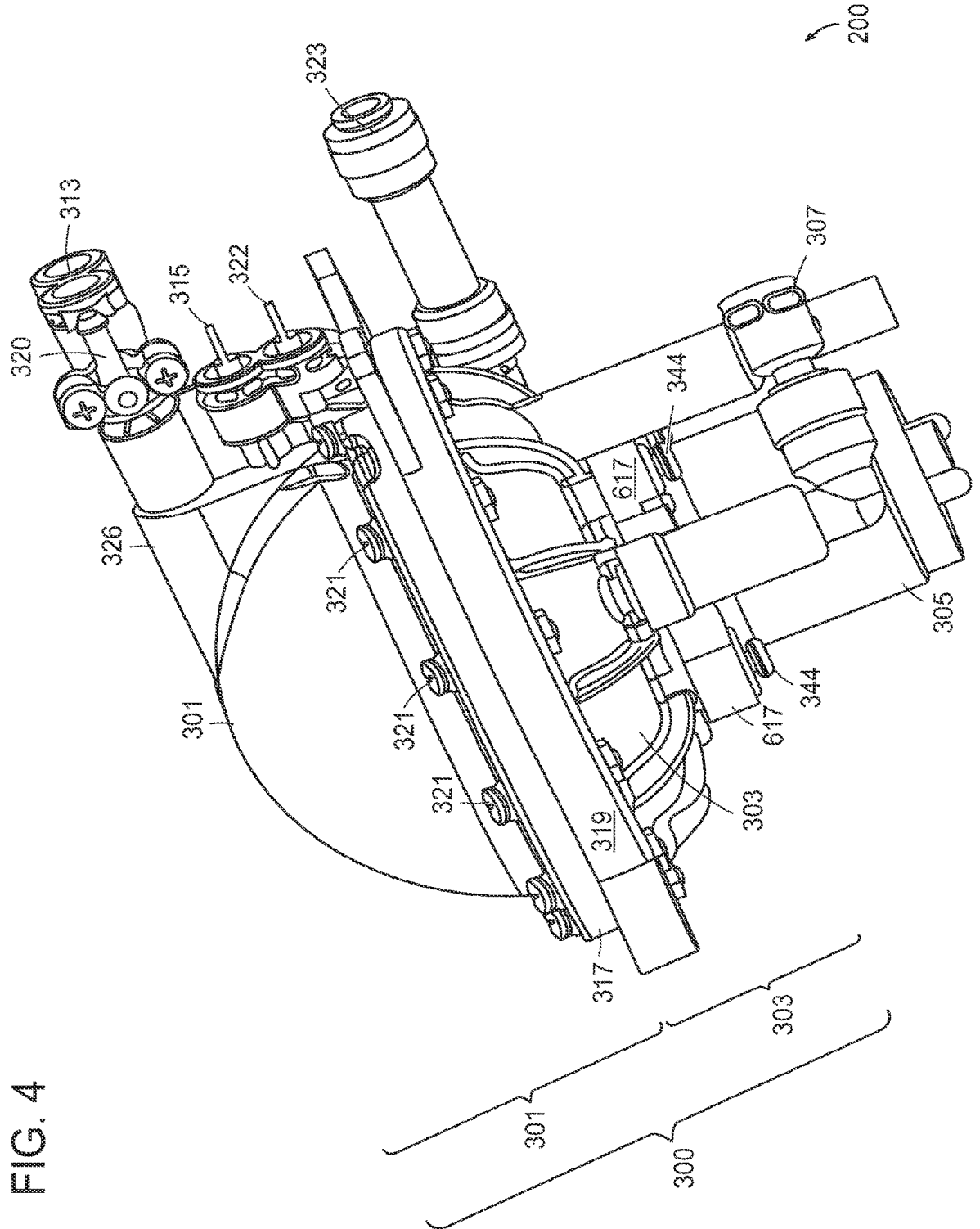
FIG. 4 is another perspective view of the carbonation mixing chamber of FIG. 3.

The inner chamber 202 or fluid reservoir in the housing 300 is configured to receive gas and fluid. The inner chamber 202 is further configured to hold a volume of gas, fluid, or a carbonated liquid. The inner chamber 202 can be connected to one or more fluid inlets 323 configured to receive fluid from a fluid reservoir. As best shown in FIG. 4, the fluid inlet 323 is in the form of a tubular structure projecting from a sidewall of the lower portion 303 of the housing. Fluid received in the inner chamber 202 from the fluid reservoir can be mediated by a flow meter that is configured to regulate the amount of liquid that flows from the fluid reservoir to the inner chamber 202. The flow meter can regulate a pump, such as a high pressure pump that is configured to pump fluid from the fluid reservoir to the inner chamber 202. Liquids can include water, juice, coffee, and the like. The flow meter can be controlled by a micro controller unit that is communicatively coupled to sensors. The fluid inlet 323 can in some embodiments be configured to receive water or other flavorings.

Figure 3:
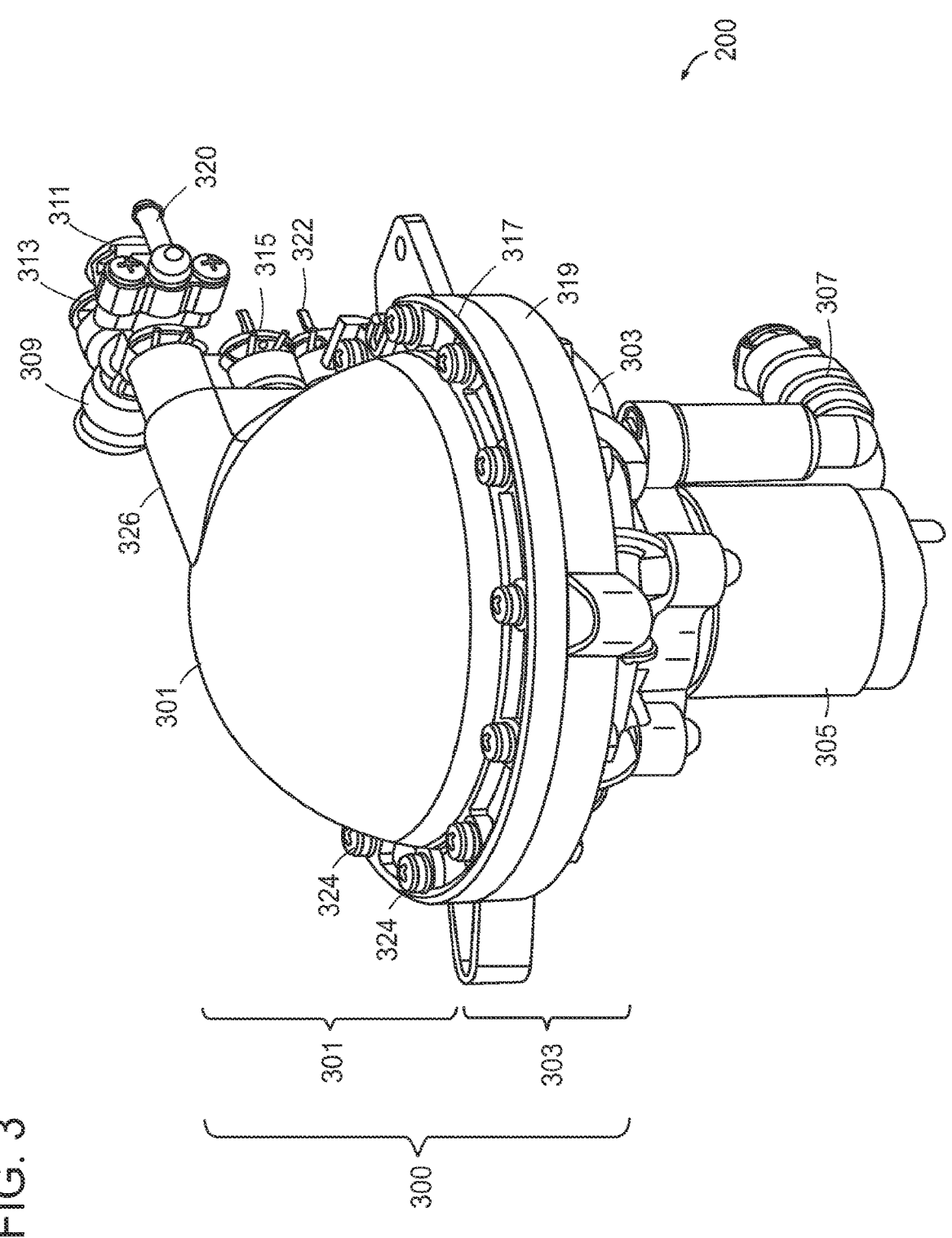
FIG. 3 is a first perspective view of one embodiment of a carbonation mixing chamber for use with a beverage dispensing system.
Figure 5:
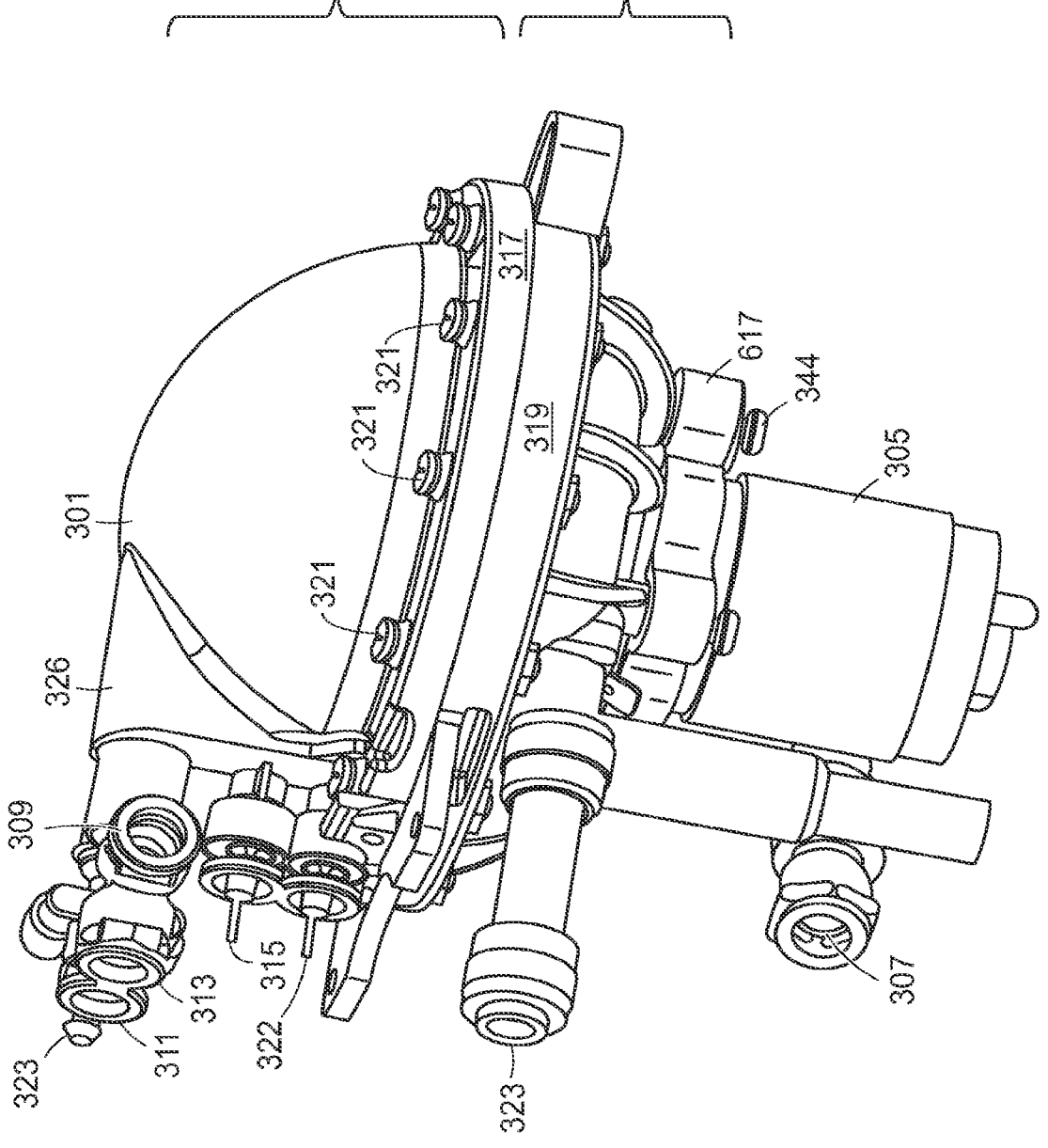
FIG. 5 is another perspective view of the carbonation mixing chamber of FIG. 3.
Figure 6:
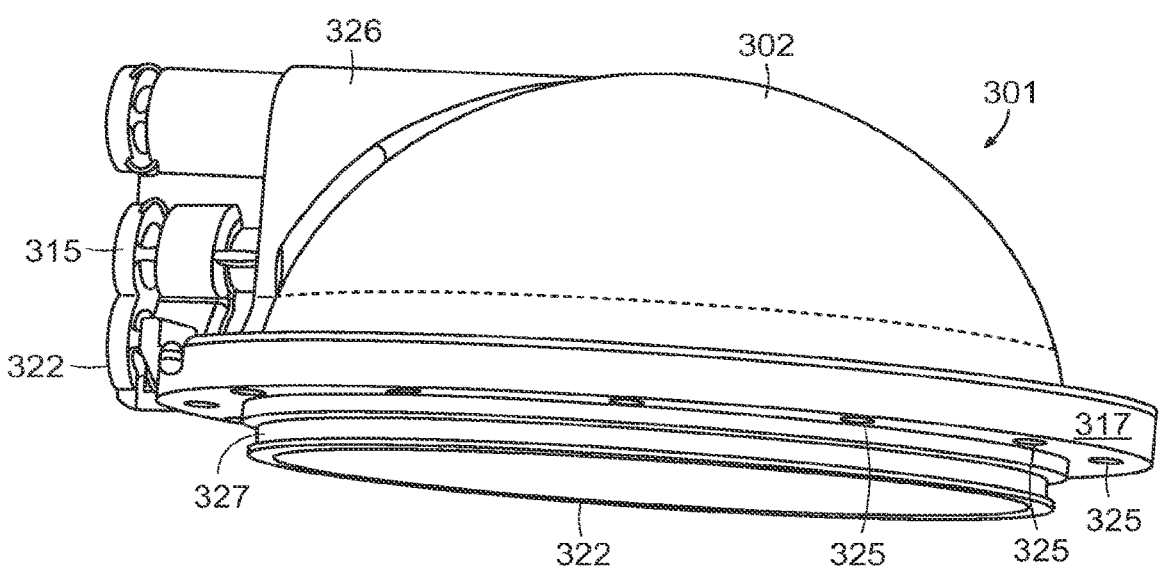
FIG. 6 is a side perspective view of an upper portion of a housing of the carbonation mixing chamber of FIG. 3.
Figures 12, 13:
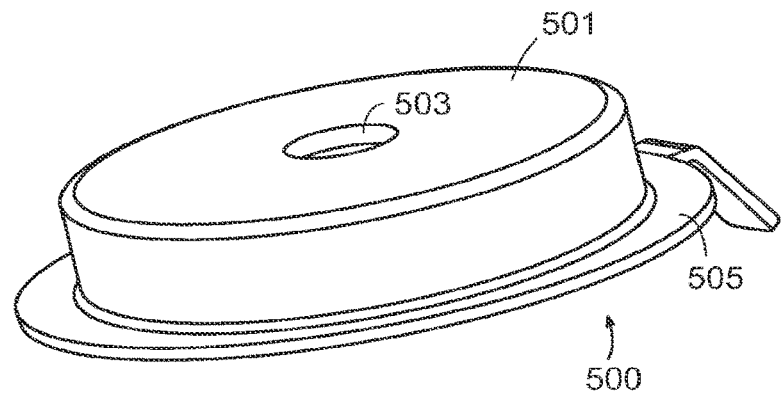
FIG. 12 is a side perspective view of one embodiment of a rigid plate for use with the carbonation mixing chamber of FIG. 3.
FIG. 13 is an exploded side perspective view of one embodiment of a motor assembly for use with the carbonation mixing chamber of FIG. 3.

The inner chamber 202 can also be connected to one or more gas inlets 309 configured to receive gas from a gas source. The gas source is configured to be a source of gas for mixing in the inner chamber 202. The transfer of gas from the gas source to the inner chamber 202 can be mediated by a gas regulator that is configured to regulate the amount of gas that flows from the gas source to the inner chamber 202 and a gas solenoid valve that is configured to open and close selectively to allow the gas to flow from the gas source to the inner chamber 202. In the illustrated embodiment, the gas is $CO_2$ and the gas source can be a $CO_2$ cylinder. However, it is contemplated that another gas can be used (in which case the resulting fluid of the mixing operation would not be a "carbonated" fluid but would be a treated fluid). As best shown in FIGS. 3, 5 and 12, the gas inlet 309 is positioned along the top of the domed hemisphere of the upper portion 301 of the housing 300. Such a configuration allows the gas to be delivered above a fluid level within the chamber.

The inner chamber 202 can also be connected to a fluid outlet 307 that is configured to dispense the carbonated or treated beverage, which is a mixture of liquid and gas. As best shown in FIGS. 4-5, in the illustrated embodiment the fluid outlet 307 is a tubular member projecting downward from a bottom wall of the lower portion 303 of the housing 300. Such a configuration allows the fluid to fully drain out of the chamber. However, in some embodiments, the carbonation system 10 can include an air pump configured to drive the treated or carbonated fluid out of the inner chamber 202 through the fluid outlet 307. The treated or carbonated fluid can be dispensed directly or indirectly into a container, such as a cup, a bottle, and the like.

As further shown in FIGS. 3-7, and 12, the upper portion 301 can include a lower water sensor 322 positioned along the side with projections thereon 326. The lower water sensor 322 can be embedded within the domed hemisphere of the upper portion 301. The lower water sensor can include a conductive probe that is configured to send a signal when the fluid level in the inner chamber 202 has reached the lower water sensor 322. The conductive probe can be configured to send the signal to a micro controller unit which can be communicatively coupled to a flow meter or other component that is configured to mediate the flow of water into the inner chamber 202. For example, the signal received at the micro controller unit from the conductive probe can cue the communicatively coupled flow meter to stop the flow of water into the inner chamber 202 in a set amount of time. For example, the signal can span 2 seconds, or any other set amount of time depending upon the spacing between the lower water sensor 322 and the upper water sensor 315.

The upper portion 301 can also include an upper water sensor 315. As illustrated in FIGS. 3-7, and 12, the upper water sensor 315 can be positioned along the side of the upper portion 301 having projections thereon 326, and be positioned substantially above the lower water sensor 322. The upper water sensor 315 can be a conductive probe configured to send a signal to a microcontroller unit. For example, as discussed above, the conductive probe associated with the upper water sensor 315 can also be configured to send the signal to a micro controller unit which can the same or different to the micro controller unit discussed above. The micro controller unit can be communicatively coupled to a flow meter or other component that is configured to mediate the flow of water into the inner chamber 202. For example, the signal received at the micro controller unit from the conductive probe of the upper water sensor 315 can cue the communicatively coupled flow meter to stop the flow of water into the inner chamber 202. The upper water sensor 315 can be configured to send a signal to the gas regulator to fill the inner chamber 202 with gas.

In other embodiments, additional valves can be connected to the housing 300. For example, additional valves can be connected to the upper portion 301 of the housing 300 via one or more ports. These additional valves can include a vent solenoid valve connected to a port 313 and configured to vent pressure from the inner chamber 202 at a predefined rate. This may provide an advantage over conventional systems which may be configured to vent pressure all at once. Advantageously, in an exemplary embodiment, the bleeding off of pressure at a defined rate may prevent carbonation loss within the inner chamber 202 such that the carbonated beverage is produced at a better quality. One or more pressure sensors can be connected to the inner chamber 202 and can be configured to control the operation of the vent solenoid valve of port 313. The vent solenoid valve of port 313 can be configured to expel a set amount of pressure when the valve is opened. The vent solenoid valve of port 313 can include a solenoid vent configured to be repeatedly opened and closed to release pressure as needed in a slow release.

In other aspects, a burst disk valve 320 can be connected to the upper portion 301 of the housing 300. The burst disk valve 320 can be configured to seal the inner chamber 202. However, when a set amount of pressure is reached in the inner chamber 202 the burst disk valve 320 can be configured to rupture or break or open, releasing the contents of the inner chamber 202. The operation of the burst disk valve 320 can be coupled to one or more sensors configured to sense the pressure in the inner chamber 202.

In other aspects, additional pressure release valves can be connected to the upper portion 301 of the housing 300 via a port to allow for fast diffusion of pressure from the inner chamber 202. For example, when pressure release valves can be configured to open so as to release the contents of the inner chamber 202 when the pressure measured in the inner chamber 202 exceeds a set threshold. For example, the upper portion 301 of the housing 300 can be connected to one, or two, or more pressure release valves, each of which can be configured to release pressure when the pressure inside of the inner chamber 202 or the pressure differential between the inner chamber 202 and the environment reaches the same or different thresholds.

Additional sensors can be embedded within the housing 300. Additional sensors can include a temperature sensor configured to measure temperature in the chamber, such as a negative temperature coefficient (NTC) thermistor, or the like.

Each of the fluid inlet, gas inlet, and fluid outlet can include a valve that is movable between open and closed positions. The inner chamber 202 can be configured to be fluidically sealed when the valves are in the closed position. Additionally, the inner chamber 202 can be configured to be hermetically sealed to prevent the flow of gas when the valves are in the closed position.

Figure 7:
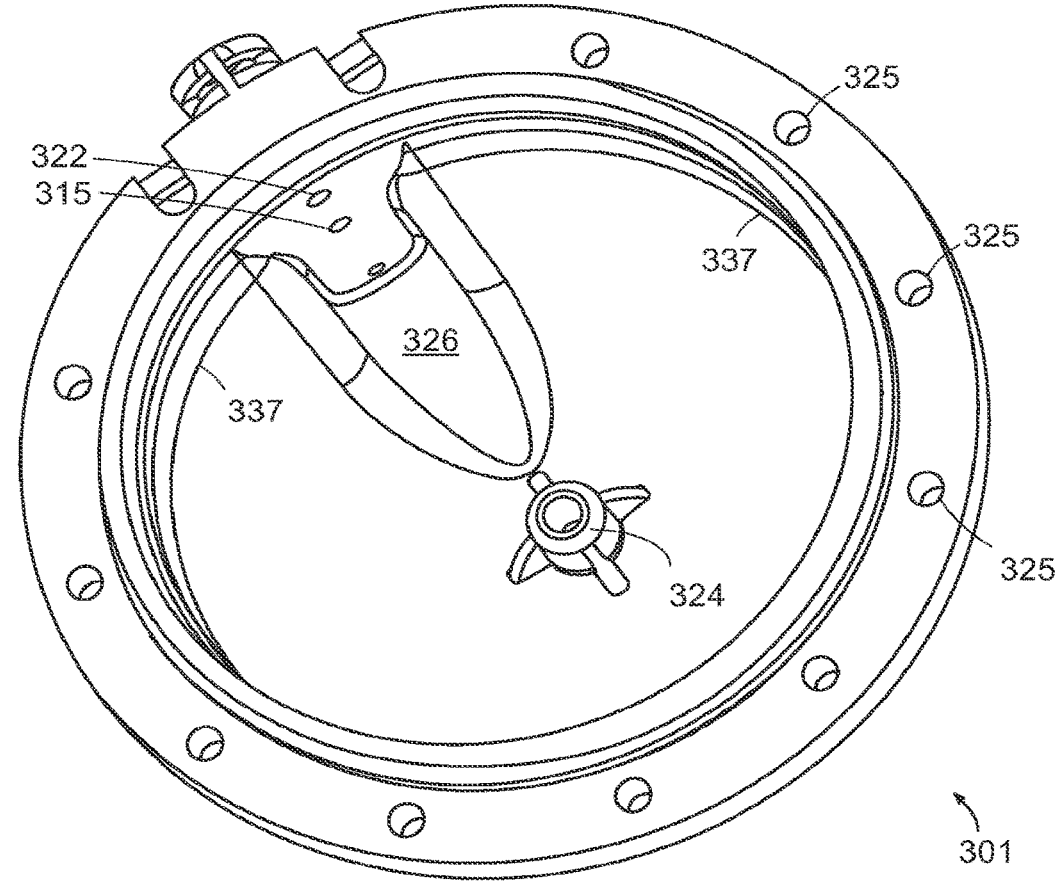
FIG. 7 is a bottom perspective view of an upper portion of a housing of the carbonation mixing chamber of FIG. 3.
Figure 8:
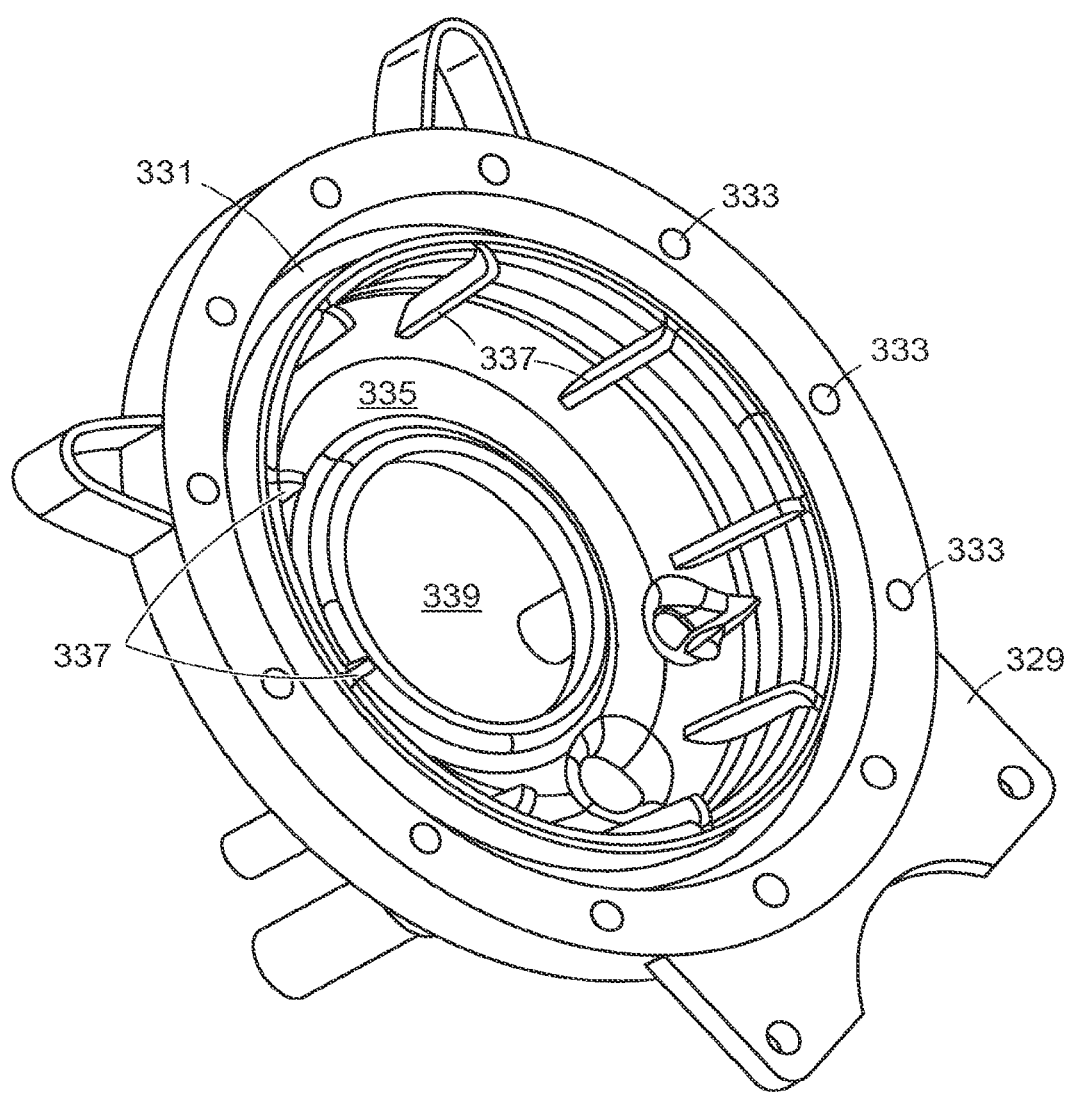
FIG. 8 is a top perspective view of a lower portion of a housing for the carbonation mixing chamber of FIG. 3.

The inner chamber 202 can include a number of additional features to aid in mixing of a gas with a fluid. For example, the interior surface of the inner chamber 202 can have a plurality of ribs 337 that are positioned radially around the inner chamber 202. The ribs 337 can be integrally formed along the interior surface of the inner chamber 202 or alternatively, can be affixed thereto. As shown in FIG. 7, the ribs 337 can be dispersed along the interior surface of the upper portion 301 longitudinally. As shown in FIG. 8, the ribs 337 can also be dispersed along the inner surface 335 of the lower portion 303 latitudinally. The ribs 337 can have any suitable shape, including having a fin-like shape with one end of the rib having a shorter height than a second end of the rib with a curve therebetween. The ribs 337 can have a substantially rectangular shape with equal heights at a first end and a second end. The ribs 337 can be straight or curved. In some embodiments, the ribs can be formed of plastic. Each of the plurality of ribs can be identical, or can vary in size or shape. The ribs 337 can be oriented longitudinally, latitudinally, or any combination thereof. The ribs 337 can be configured to agitate the liquid and gas mixtures so as to improve carbonation by providing an additional surface area to the liquid, gas, or liquid and gas mixture. The ribs provide additional surface area and roughness to the smooth internal walls so as to prevent liquids from spinning against the internal walls and instead so that the liquids mix with the gas in the inner chamber 202. In other aspects, the interior surface of the inner chamber 202 can be formed from or coated with a hydrophilic material. The hydrophilic material can be configured to allow liquids contained within the inner chamber 202 to be in close proximity to the interior surface of the inner chamber 202, thus reducing the headspace or airgap within the inner chamber 202. This is advantageous as there is less space for a gas (i.e., CO2) to leave the liquid (i.e., H2O), thus providing improved carbonation. In some embodiments, the ribs 337 (discussed above) can also be coated or formed from a hydrophilic material.

The upper and lower portions 301, 303 of the housing 300 can be formed of a variety of materials, but in an exemplary embodiment the housing 300 is formed from any suitable plastic. This aids in reducing costs while providing a relatively light weight chamber. However, in order to withstand high pressure, e.g., up to 1.6 or 1.7 mega pascals, certain portions of the housing 300 can be relatively thick, e.g., in a range of about 10 to 12 mm. In some embodiments, the lower portion 303 can have a thickness that is greater than a thickness of the upper portion 301. For example, in some embodiments, the housing may have a nominal wall thickness of 3.5 mm and increase to approximately 6 mm in the thickest areas.

Figure 9:
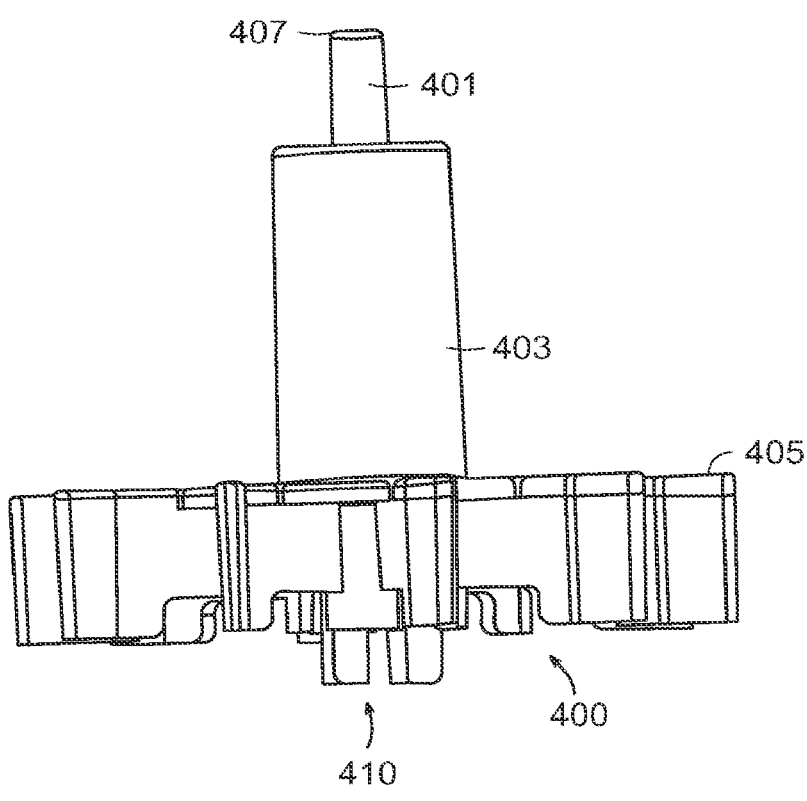
FIG. 9 is a side perspective view of one embodiment of an agitator for use with the carbonation mixing chamber of FIG. 3.
Figure 10:
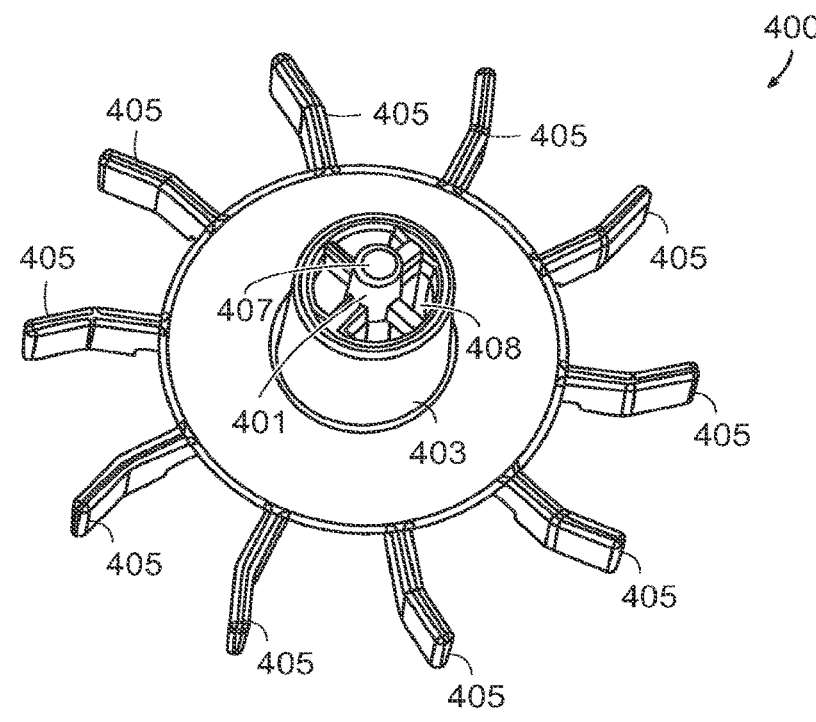
FIG. 10 is a top perspective view of the agitator of FIG. 9 for use with the carbonation mixing chamber of FIG. 3.

FIGS. 9-10 illustrate an exemplary agitator 400 configured to be disposed within a housing, such as housing 300. In the illustrated embodiment, the agitator 400 is the form of an impeller having an elongate shaft 401 with a top end 407 and a bottom end 410. The elongate shaft 401 can have an enlarged middle shaft 403 with a diameter larger than the diameter of the top end 407 of the elongate shaft 401. The interior of the middle shaft 403 provides an inner lumen for the elongate shaft. As shown in FIG. 9, there can be one or more recesses or openings 408 between the top end 407 of the elongate shaft 401 and the middle shaft 403. The openings 408 can be positioned to expose the inner lumen of the elongate shaft 401 to the outside of the elongate shaft 401. During operation of the carbonation mixing chamber, air and liquid can flow from the inner chamber 202, through the top opening 408 between the top end 407 of the elongate shaft 401 and the middle shaft 403, downwards through the lumen of the elongate shaft 401 towards the terminal end 410 of the elongate shaft towards one or more recesses. Recesses can be positioned proximate a plurality of arms 405 that extend from the elongate shaft 401.

Figure 14:
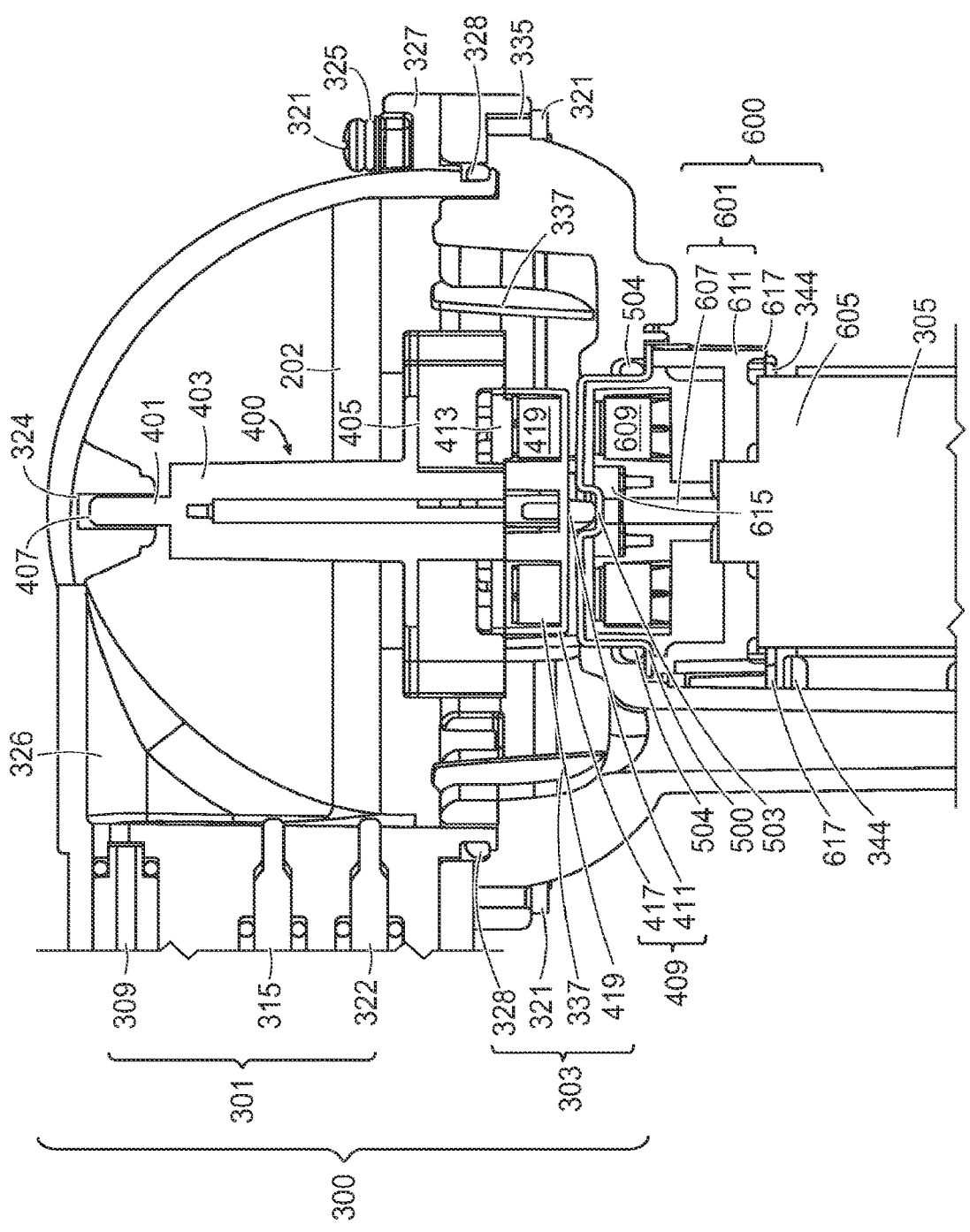
FIG. 14 is a side cross-sectional view of the carbonation mixing chamber of FIG. 3.

As illustrated in FIGS. 7 and 14, the top end 407 of the elongate shaft can be positioned in alignment or engaged with a housing 324 formed in or attached to a substantially central position on the inner surface of the upper portion 301.

As further shown, the elongate shaft 401 can have a plurality of blades or arms 405 extending radially outward therefrom. The arms 405 can be positioned proximate the terminal end of the elongate shaft 401. The agitator 400 can have any number of arms including 2, 3, 4, 5, 6, 8, etc. The arms 405 can be shaped to aid in pushing fluid in a circular pattern. As shown, the illustrated arms increase in size radially from the elongate shaft 401. The arms 405 can also be curved. The arms 405 can be spaced equidistantly around the elongate shaft 401 in the lower portion of the agitator. In other aspects, the arms 405 can have one or more holes or openings or be shaped to be hollow, so as to allow liquid and gas to flow through. All or certain portions of the arms 405 can be solid components configured to push liquid and gas or a combination thereof. In use, the arms 405 are configured to agitate the fluid and gas mixture, and thus can have various shapes to aid in doing so.

The agitator 400 can be mated to an agitator coupling housing 409 configured to magnetically couple with a motor coupling housing, discussed further below, in order to allow a rotational force to be transmitted to the agitator 400. The agitator coupling housing 409 can be positioned such that the arms 405 of the agitator 400 sit above the agitator coupling housing 409. The elongate shaft 401 can be fixedly mated to or integrally formed with the agitator coupling housing such that rotation of the agitator coupling housing causes corresponding rotation of the elongate shaft. The agitator coupling housing 409 can have a lower casing 417 and an upper plate 413. The upper plate 413 can include one or more locking elements 415 configured to engage with receiving elements positioned in the interior of the lower casing. The agitator coupling housing 409 can include one or more compartments for holding magnets 419. A first set of magnets 419 can be disposed within the agitator coupling housing 409. The first set of magnets 419 can include any suitable number of magnets, for example, 2, 3, 4, 5, 6, or more magnets. Compartments for holding magnets 419 can be in any suitable shape compatible with magnets. For example, the compartments can be square shaped, oval shaped, circular shaped and the like. The compartments can be spaced radially throughout the agitator coupling housing 409.

Figure 11:
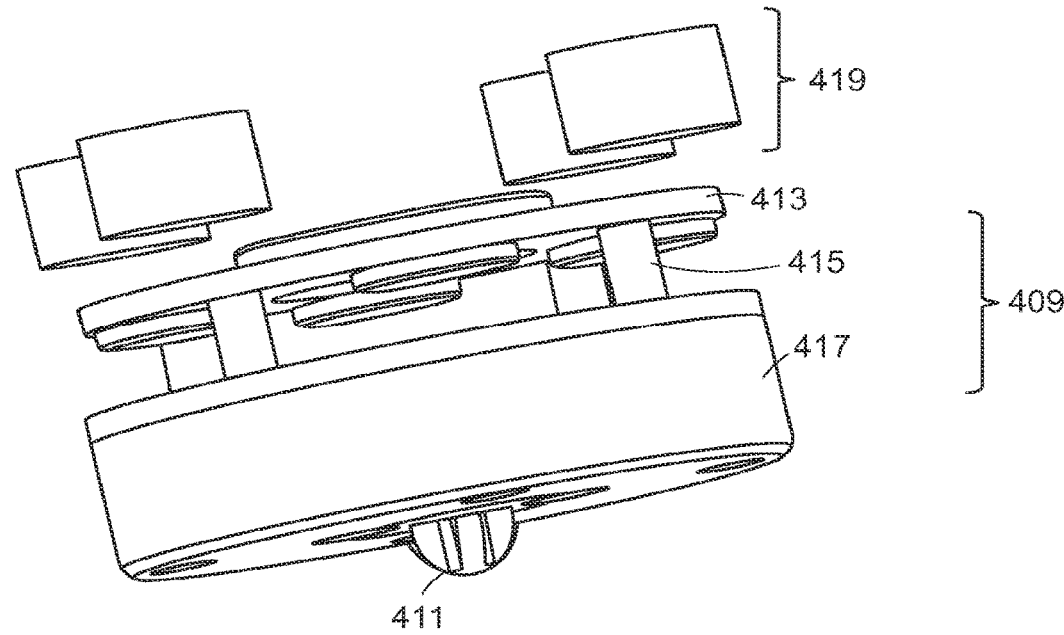
FIG. 11 is a side perspective view of one embodiment of an agitator coupling housing for use with the carbonation mixing chamber of FIG. 3.

As further shown in FIG. 11, the agitator coupling housing 409 can include a nub 411 formed on a bottom surface of the casing 417. The illustrated nub 411 has a hemispherical shape, however it can have various shapes and sizes. The nub 411 can be integrally formed with the casing 417, or in other embodiments it can be formed from the terminal end of the elongate shaft 401 projecting through the casing 417. The nub 411 can be configured to engage with a divot formed in a separation plate, as discussed below. The nub can be free to float or move within the divot, so as to provide clearance for movement of the agitator 400.

As previously indicated, the carbonation mixing chamber can also include a rigid separation plate to provide an interface between the agitator coupling housing 409 and the motor coupling housing discussed further below. FIG. 12 illustrates one exemplary embodiment of a rigid separation plate 500. The illustrated plate 500 is substantially cylindrical with a flange 505 extending radially outward from a rim thereof. The plate has an upper surface 501 with a divot 503 positioned in the center. The divot 503 can be configured to receive the nub 411 of the agitator coupling housing 409. The divot 503 can have a depth that is less than a height of the nub 411 such that the agitator coupling housing 409 is spaced a distance above the upper surface 501 of the plate 500. In this manner, the agitator coupling housing 409 can rotate with respect to the plate 500 without friction from the plate. The upper surface 501 of the plate 500 can be configured to fit within the opening 399 of the lower portion 303 of the housing 300. The flange 505 can be configured to be positioned between an outer surface of the lower portion 303 of the housing 300 and an upper surface of the motor coupling housing (discussed below). As shown in FIG. 14 a scaling gasket 504 can be positioned on the flange and can seal the interface between the plate and the lower portion 303 of the housing.

The plate 500 can be made from a variety of rigid materials, but in an exemplary embodiment it is made of a metal having sufficient durability to withstand high pressures. Exemplary materials include stainless steel. However, the rigid plate 500 can be composed of any inert materials. The rigid plate 500 can have a maximum thickness that is less than the maximum thickness of the sidewall of the housing. The maximum thickness of the rigid plate 500 can be reduced such that the set of magnets in the agitator coupling housing can be magnetically coupled to the set of magnets in the motor assembly discussed below. The rigid plate 500 can have a thickness in the range of 1.6 mm to 2 mm, and optionally 1.8 mm. The rigid plate 500 can have a thickness that is relatively thin, e.g., about one-sixth of the thickness of the housing. The thickness of the rigid plate can be determined such that the magnetic coupling between the agitator coupling housing and the motor assembly is not adversely affected by the increase in distance between the sets of magnets due to the presence of the rigid plate. The minimum thickness of the rigid plate can be configured to withstand the high pressures that are generated in the housing, e.g., 1.6 mega pascals. For example, in an exemplary embodiment, the rigid plate 500 can be about 0.8 mm thick and be designed to withstand pressures around 3.5 MPa.

As indicated above, the carbonation mixing chamber can include a motor assembly. FIG. 13 illustrates one embodiment of a motor assembly 600. The motor assembly 600 can be disposed external to the housing 300 and can have a motor coupling housing 601 with a second set of magnets 609 disposed therein and positioned in magnetic engagement with the first set of magnets. The motor assembly 600 can also include a drive shaft 607 coupled to the motor coupling housing 601, and a motor 605 coupled to the drive shaft 607 and configured to rotate the drive shaft and the motor coupling housing 601.

The motor coupling housing 601 can be in the form of a substantially cylindrical housing. The motor coupling housing 601 can include one or more compartments for holding magnets. A second set of magnets 609 can be disposed within the motor coupling housing 601. The second set of magnets 609 can include any suitable number of magnets, for example, 2, 3, 4, 5, 6, or more magnets. In one embodiment, the second set of magnets 609 has the same number of magnets as the first set of magnets. Compartments for holding magnets can be in any suitable shape compatible with magnets. For example, the compartments can be square shaped, oval shaped, circular shaped and the like. The compartments can be spaced radially throughout the motor coupling housing. Magnets of the second set of magnets can be positioned within the motor coupling housing such that the second set of magnets are proximate the first set of magnets so as to account for the exponential drop in magnetic force with distance.

The motor coupling housing 601 can have a variety of configurations, but in the illustrated embodiment it has a cup-shaped top plate 615 that sits within a substantially circular tray 613. The top plate 615 can be configured to house the second set of magnets 609. The tray can have a central opening 613 configured to receive a drive shaft 607 attached to a motor 605. The tray can also have projecting arms 617 configured to assist in mounting the motor coupling assembly to the exterior side of the lower portion 303 of the housing 300. As best shown in FIG. 4 screws 344 can be passed through the projecting arms 617 of the tray to engage with one or more receiving holes positioned along the lower portion 303 of the housing 300. In use, the motor 605 is configured to rotate the drive shaft 607, and thereby rotate the motor coupling housing 601. Rotation of the motor coupling housing 601 results in the rotation of the second set of magnets 609. Due to the magnetic coupling between the second set of magnets 609 in the motor coupling housing 601 and the first set of magnets 419 in the agitator coupling housing 409, rotation of the second set of magnets 609 can cause corresponding rotation of the first set of magnets 419. Rotation of the first set of magnets 419 in the agitator coupling housing 409 in turn can result in the rotation of the agitator 400.

FIG. 14 is a cross-sectional diagram of the carbonation mixing chamber 200. As illustrated, the carbonation mixing chamber 200 include the housing 300 with upper and lower portions 301, 303, the agitator 400 with agitator coupling housing 409, the motor assembly 600, and the rigid plate 500.

As shown, the housing 300 includes an inner chamber 202 with a fluid inlet, a gas inlet 309, and an outlet configured to dispense a mixture of fluid and gas. The housing 300 includes the upper portion 301 with a side 326 including projections for the lower water sensor 322, the upper water sensor 315, and the gas inlets 309. Additionally, the upper portion 301 and lower portion 303 of the housing 300 mate to one another to define the inner chamber 202. The upper portion 301 and lower portion 303 are mated via screws 321 and an o-ring 328.

The agitator 400 is disposed within the housing 300. As shown, the agitator 400 includes an elongate shaft 401 with a top end 407 that engages with a housing 324 positioned along the inner surface of the upper portion 301. The elongate shaft 401 includes a middle portion 403 and has a plurality of arms 405 which extend radially outward. The agitator coupling housing 409 is connected to the terminal end of the elongate shaft 401. The agitator coupling housing 409 includes the casing 417 configured to hold the first set of magnets 419. The agitator coupling housing 409 is positioned on a bottom wall of the lower portion 303 of the housing. The agitator coupling housing 409 includes nub 411 which engages with divot 503 of rigid plate 500. As shown, a second sealing gasket or o-ring 504 can be positioned between the lower portion 303 of the housing 300 and the rigid plate 500.

The motor assembly 600 is disposed external to the housing 300 and includes motor coupling housing 601 with a second set of magnets 609 disposed therein. The first set of magnets 419 are positioned in magnetic engagement with the second set of magnets 609. The motor coupling housing 601 is coupled to a motor 305 by a drive shaft 607. The motor 305 is configured to rotate the drive shaft 607 and motor coupling housing 601 such that the second set of magnets 609 rotates to cause a corresponding rotation of the first set of magnets 419. The rotation of the first set of magnets 419 in turn rotates the agitator 400. As shown, the motor coupling housing is mounted to the lower portion 303 by screws 304.

Figure 15:
FIG. 15 is a flow-chart showing one embodiment of a process for using a carbonation mixing chamber.
Figure 15:

FIG. 15 illustrates a method for utilizing a carbonation mixing chamber such as carbonation mixing chamber 200. In step 801, a liquid can be added to the carbonation mixing chamber. In a second step 803, a gas can be added to the carbonation mixing chamber. In some embodiments, the liquid can be added before the gas. In some embodiments, the gas can be added to the chamber before the liquid. In some embodiments, the gas and the liquid can be added to the inner chamber simultaneously. After the liquid and gas have been added to the chamber, a motor is activated to drive rotation of the agitator in the chamber and form a carbonated fluid at step 805. The rotation of the agitator causes the gas and the liquid in the chamber to mix, as described herein, such that the gas dissolves in the liquid.

In some embodiments, the inner chamber can be filled with a liquid (e.g., water). Once the liquid reaches the first sensor, a signal can be sent to a processor. Once the liquid reaches a second top sensor, the processor can be sent a signal to stop filling the inner chamber with liquid. The processor can also be sent a signal to inject a gas (e.g., carbon dioxide). The gas can be injected until a target pressure (e.g., 0.65 MPa) is reached. Subsequently, a motor can be activated. Activation of the motor can result in the rotation of the agitator for a set amount of time (e.g., 5 seconds). Rotation of the agitator can expose the gas to as much liquid as possible as the liquid flows through the agitator structure in accordance with the systems and methods described herein.

The motor can be activated in any number of ways. For example, the motor can be activated automatically (e.g., by a microcontroller or other processor of the motor or carbonation system that includes the motor) after each of the liquid and the gas are added to the chamber. The motor can be stopped and re-started as needed to achieve the required pressure and meet the time scale as determined by a user or program. The carbonated fluid can be dispensed from the chamber to a container (e.g., a cup, a bottle, etc.) through an outlet valve in fluid communication with the chamber.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation can be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A method for mixing fluid and gas, comprising:
activating a motor to rotate an outer magnetic drive housing and thereby cause corresponding rotation of an inner magnetic drive housing disposed within a mixing chamber and positioned on an opposite side of a separation plate from the outer magnetic drive housing, the mixing chamber being fluidically sealed and having a fluid and a gas disposed therein, and rotation of the inner magnetic drive housing rotating an agitator coupled thereto to thereby mix the fluid and gas, wherein rotation of the agitator causes the gas to flow from a location above the liquid within the mixing chamber into an upper opening in an elongate shaft of the agitator and out of a lower opening of the elongate shaft of the agitator.

2. The method of claim 1, wherein the agitator includes a plurality of arms extending radially outward from a central shaft, a terminal end of the central shaft being freely movably positioned within a divot formed in the separation plate.

3. The method of claim 1, wherein the mixing chamber is disposed within a beverage dispensing system, and the method further comprises dispensing the mixed fluid and gas into a container.

4. The method of claim 1, wherein the flow of the gas within the internal chamber increases an internal pressure within the inner chamber.

5. The method of claim 4, further comprising causing, via an increase in the internal pressure within the inner chamber, a burst disk valve in fluid communication with the inner chamber to rupture.

6. The method of claim 1, further comprising, prior to activating the motor, actuating a first valve to cause the gas to flow into the inner chamber.

7. The method of claim 6, further comprising, prior to activating the motor, actuating a second valve to cause the gas to flow into the inner chamber.

8. A method, comprising:
receiving, within an inner chamber, a fluid from a fluid source and a gas from a gas source, the inner chamber comprising an agitator coupled to an inner magnetic drive; and
driving, via a motor, an outer magnetic drive disposed outside the inner chamber and magnetically coupled to the inner magnetic drive to cause the agitator to rotate, thereby causing gas to flow from an upper region of the inner chamber and through the agitator to a lower region of the inner chamber.

9. The method of claim 8, wherein driving the outer magnetic drive causes the gas and the liquid to form a combined treated fluid.

10. The method of claim 9, further comprising dispensing, via a dispense outlet in the inner chamber, the treated fluid.

11. The method of claim 8, wherein driving the outer magnetic drive increases an internal pressure within the inner chamber.

12. The method of claim 11, further comprising causing, via an increase in the internal pressure within the inner chamber, a burst disk valve in fluid communication with the inner chamber to rupture.

* * * * *